United States Patent [19]
Takahashi

[11] Patent Number: 5,745,295
[45] Date of Patent: Apr. 28, 1998

[54] IMAGE DISPLAY APPARATUS

[75] Inventor: Koichi Takahashi, Hachioji, Japan

[73] Assignee: Olympus Optical Co., Ltd., Tokyo, Japan

[21] Appl. No.: 757,245

[22] Filed: Nov. 27, 1996

[30] Foreign Application Priority Data

Nov. 28, 1995 [JP] Japan .................................. 7-309229

[51] Int. Cl.$^6$ ................................................ G02B 27/14
[52] U.S. Cl. ........................... 359/631; 359/621; 359/627; 359/639
[58] Field of Search .................................. 359/631, 621, 359/627, 639, 636

[56] References Cited

U.S. PATENT DOCUMENTS

| Re. 27,356 | 5/1972 | La Russa . | |
|---|---|---|---|
| 3,697,154 | 10/1972 | Johnson | 350/174 |
| 4,026,641 | 5/1977 | Bosserman et al. . | |
| 4,669,810 | 6/1987 | Wood . | |

FOREIGN PATENT DOCUMENTS 3-101709  4/1991  Japan .

OTHER PUBLICATIONS

Patent Abstract of Japan, 62–214782, Kanda, Sep. 1987 –see abstract.

*Primary Examiner*—Frank G. Font
*Assistant Examiner*—Reginald A. Ratliff
*Attorney, Agent, or Firm*—Cushman Darby & Cushman IP Group of Pillsbury Madison & Sutro LLP

[57] ABSTRACT

An image display apparatus which enables observation of a clear image at a wide field angle with substantially no reduction in the brightness of the image, and which is extremely small in size and light in weight and hence unlikely to cause the observer to be fatigued. The apparatus includes an image display device (6) and an ocular optical system (9) for leading an image of the display device (6) to an observer's eyeball (1). The ocular optical system (9) has a first optical element (7) and a second optical element (8). The first optical element (7) has three surfaces, and a space formed by the surfaces is filled with a medium having a refractive index larger than 1. The three surfaces are, in the order of backward ray tracing from the observer's eyeball (1) toward the image display device (6), a first surface (3) serving as both a refracting surface and an internally reflecting surface, a second surface (4) which is a reflecting surface of positive power facing the first surface (3) and decentered or tilted with respect to an observer's visual axis (2), and a third surface (5) which is a refracting surface closest to the image display device (6). The second optical element (8) has refracting action and is disposed between the first surface (3) and the observer's eyeball (1).

19 Claims, 12 Drawing Sheets

FIG. 17 (PRIOR ART)
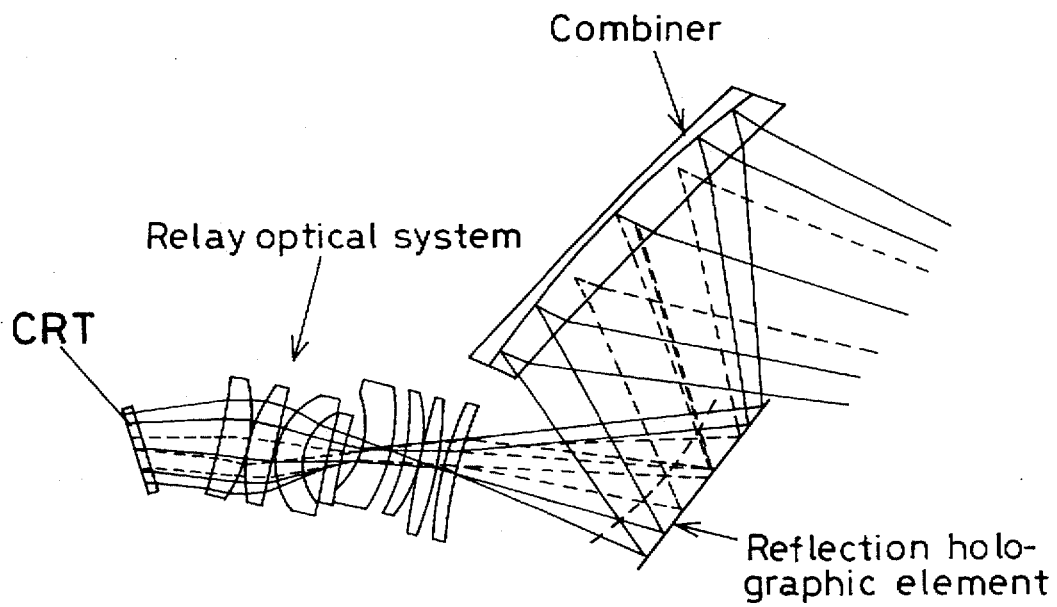
FIG. 18(a) (PRIOR ART)
FIG. 18(b) (PRIOR ART)
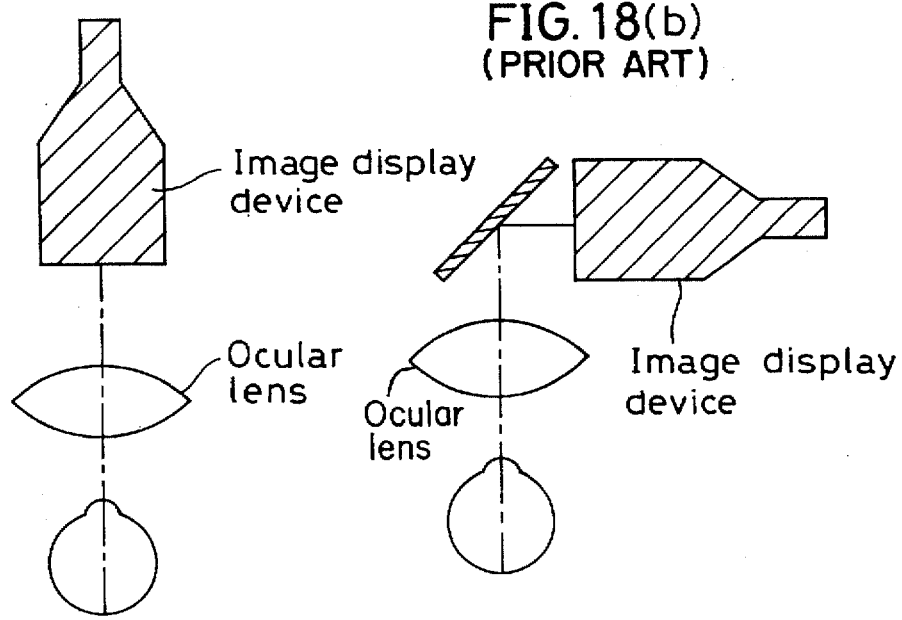

IMAGE DISPLAY APPARATUS

BACKGROUND OF THE INVENTION

The present invention relates to an image display apparatus and, more particularly, to a head- or face-mounted image display apparatus that can be retained on the observer's head or face.

As an example of conventional head- or face-mounted image display apparatus, an image display apparatus disclosed in Japanese Patent Application Unexamined Publication (KOKAI) No. 3-101709 (1991) is known. FIG. 16(a) shows the entire optical system of the conventional image display apparatus, and FIG. 16(b) shows a part of an ocular optical system used in the image display apparatus. As illustrated in these figures, in the conventional image display apparatus, an image that is displayed by an image display device is transmitted as an aerial image by a relay optical system including a positive lens, and the aerial image is projected into an observer's eyeball as an enlarged image by an ocular optical system formed from a concave reflecting mirror.

U.S. Pat. No. 4,669,810 discloses another type of conventional image display apparatus. In this apparatus, as shown in FIG. 17, an image of a CRT is transmitted through a relay optical system to form an intermediate image, and the image is projected into an observer's eye by a combination of a reflection holographic element and a combiner having a hologram surface.

Japanese Patent Application Unexamined Publication (KOKAI) No. 62-214782 (1987) discloses another type of conventional image display apparatus. As shown in FIGS. 18(a) and 18(b), the conventional image display apparatus is designed to enable an image of an image display device to be directly observed as an enlarged image through an ocular lens.

U.S. Pat. No. 4,026,641 discloses another type of conventional image display apparatus. In the conventional image display apparatus, as shown in FIG. 19, an image of an image display device is transferred to a curved object surface by an image transfer device, and the image transferred to the object surface is projected in the air by a toric reflecting surface.

Reissued U.S. Pat. No. 27,356 discloses another type of conventional image display apparatus. As shown in FIG. 20, the apparatus is an ocular optical system designed to project an object surface onto an exit pupil by a semitransparent concave mirror and a semitransparent plane mirror.

In image display apparatuses of the type wherein an image of an image display device is relayed, as shown in FIGS. 16(a), 16(b) and 17, however, several lenses must be used as a relay optical system in addition to an ocular optical system, regardless of the type of ocular optical system. Consequently, the optical path length increases, and the optical system increases in both size and weight.

In a case where only the ocular optical system shown in FIG. 16(a) is used, as shown in FIG. 16(b), positive power resides in only the reflecting surface that has a concave surface directed toward the observer. Therefore, large negative field curvature is produced as shown by reference character P1 in the figure.

In a layout such as that shown in FIGS. 18(a) and 18(b), the amount to which the apparatus projects from the observer's face undesirably increases. Further, because an image display device and an illumination optical system are attached to the projecting portion of the apparatus, the apparatus becomes increasingly large in size and heavy in weight.

Because a head-mounted image display apparatus is fitted to the human body, particularly the head, if the amount to which the apparatus projects from the user's face is large, the distance from the supporting point on the head to the center of gravity of the apparatus is long. Consequently, the weight of the apparatus is imbalanced when the apparatus is fitted to the observer's head. Further, when the observer moves or turns with the apparatus fitted to his/her head, the apparatus may collide with something.

That is, it is important for a head-mounted image display apparatus to be small in size and light in weight. An essential factor in determining the size and weight of the apparatus is the arrangement of the optical system.

However, if an ordinary magnifier alone is used as an ocular optical system, exceedingly large aberrations are produced, and there is no device for correcting them. Even if spherical aberration can be corrected to a certain extent by forming the configuration of the concave surface of the magnifier into an aspherical surface, other aberrations such as coma and field curvature remain. Therefore, if the field angle for observation is increased, the image display apparatus becomes impractical. Alternatively, if a concave mirror alone is used as an ocular optical system, it is necessary to use not only ordinary optical elements (lens and mirror) but also a device for correcting field curvature by an image transfer device (fiber plate) having a surface which is curved in conformity to the field curvature produced, as shown in FIG. 19.

In a coaxial ocular optical system in which an object surface is projected onto an observer's pupil by using a semitransparent concave mirror and a semitransparent plane mirror, as shown in FIG. 20, because two semitransparent surfaces are used, the brightness of the image is reduced to as low a level as $1/16$, even in the case of a theoretical value. Further, because field curvature that is produced by the semitransparent concave mirror is corrected by curving the object surface itself, it is difficult to use a flat display, e.g. an LCD (Liquid Crystal Display), as an image display device.

SUMMARY OF THE INVENTION

In view of the above-described problems of the conventional techniques, an object of the present invention is to provide an image display apparatus which enables observation of a clear image at a wide field angle with substantially no reduction in the brightness of the image, and which is extremely small in size and light in weight and hence unlikely to cause the observer to be fatigued.

To attain the above-described object, the present invention provides an image display apparatus which includes an image display device for displaying an image, and an ocular optical system for projecting the image displayed by the image display device and for leading the projected image to an observer's eyeball. The ocular optical system includes a first optical element and a second optical element. The first optical element has at least three surfaces, and a space formed by the at least three surfaces is filled with a medium having a refractive index larger than 1. The at least three surfaces are, in order in which light rays pass according to backward ray tracing from the observer's eyeball toward the image display device, a first surface which serves as both a refracting surface and an internally reflecting surface, a second surface which is a reflecting surface of positive power facing the first surface and decentered or tilted with respect to an observer's visual axis, and a third surface which is a refracting surface closest to the image display device. The second optical element has refracting action and is disposed between the first surface and the observer's eyeball.

In this case, it is desirable that the second optical element should have positive power and be a positive lens.

The operation of the image display apparatus according to the present invention will be described below. The following explanation will be given on the basis of backward ray tracing in which light rays are traced from the observer's pupil position toward the image display device for the convenience of designing an optical system. It should be noted that the term "visual axis" means an axial principal ray when the observer views the image display device, facing forward.

The basic arrangement of the present invention is as follows: The ocular optical system includes a first optical element and a second optical element. The first optical element has at least three surfaces, and a space formed by the at least three surfaces is filled with a medium having a refractive index larger than 1. The at least three surfaces are, in order in which light rays pass according to backward ray tracing from the observer's eyeball toward the image display device, a first surface which serves as both a refracting surface and an internally reflecting surface, a second surface which is a reflecting surface of positive power facing the first surface and decentered or tilted with respect to an observer's visual axis, and a third surface which is a refracting surface closest to the image display device. The second optical element has refracting action and is disposed between the first surface and the observer's eyeball. Accordingly, it is possible to correct coma and field curvature produced by the second surface, which is decentered or tilted with respect to the visual axis, and hence possible to provide the observer with a clear image for observation which has a wide exit pupil diameter and a wide observation field angle.

Concave mirrors generally have such nature that, if strong power is given to the concave surface, Petzval sum increases, and curvature of field is produced. Moreover, negative comatic aberration is produced.

In the ocular optical system according to the present invention, the first optical element is arranged such that a space formed by the first, second and third surfaces is filled with a medium having a refractive index larger than 1. Therefore, light rays from the pupil are refracted by the first surface. Accordingly, it is possible to minimize the height at which extra-axial principal and subordinate rays are incident on the second surface. Because the height of the principal rays is low, the size of the second surface is minimized, and thus the ocular optical system can be formed in a compact structure. Moreover, because the height of the subordinate rays is reduced, it is possible to minimize comatic aberrations produced by the second surface, particularly higher-order comatic aberrations.

As the field angle of an image display apparatus becomes wider and the size thereof becomes smaller, the tilt angle of the second surface, which is the first reflecting surface, becomes larger, and higher-order comatic aberrations produced by the second surface increase. Moreover, astigmatism, which is produced by the tilt of the surface, also increases. Accordingly, it may be difficult to satisfactorily correct these aberrations by only the first optical element, in which the space formed by the first, second and third surfaces is filled with a medium having a refractive index larger than 1.

Therefore, the second optical element is provided between the observer's eyeball and the image display device in addition to the above-described first optical element. More specifically, the second optical element is disposed between the first surface and the observer's eyeball. By doing so, it becomes possible to correct aberrations produced in the ocular optical system even more effectively.

In the first optical element, the second surface and the internally reflecting surface of the first surface, which is subsequent to the second surface, are reflecting surfaces. Therefore, no chromatic aberration is produced at these surfaces. Further, at the third surface, which lies in close proximity to the image display device, the principal rays are approximately parallel to the optical axis. Therefore, the third surface produces minimal chromatic aberration. Consequently, chromatic aberration produced by the first surface, which is a refracting surface, is dominant in the ocular optical system. In a wide-field optical system such as that in the present invention, lateral chromatic aberration appears more markedly than axial chromatic aberration. That is, it is important to correct lateral chromatic aberration produced by the first surface, and it is possible to display an image which is clearer and of higher resolution by correcting the lateral chromatic aberration. Accordingly, the ocular optical system is arranged such that the first optical element and the second optical element having refracting action are disposed between the observer's eyeball and the image display device. By doing so, optical elements constituting the ocular optical system can be composed of two or more different mediums, and it becomes possible to correct the lateral chromatic aberration by virtue of the difference in Abbe's number between these mediums.

If it has positive power, the second optical element markedly reduces the height of extra-axial rays and minimizes the height of subordinate rays in ray bundles at all field angles. Accordingly, the height of extra-axial rays incident on the second surface of the first optical element is further reduced. Therefore, the first optical element can be arranged in a compact form. Further, because subordinate rays at the second surface are narrowed down, the occurrence of comatic aberrations, including aberrations due to decentration, can be suppressed very effectively.

By using a positive lens to constitute the second optical element, the production is facilitated, and the cost can be reduced. In the case of an ordinary lens, a wide selection of vitreous materials is allowed. This is advantageous to the correction of chromatic aberrations.

By using a cemented lens to constitute the second optical element, it is possible to correct both chromatic aberrations produced in the first and second optical elements; this is useful to ensure a clearer observation image at a wide field angle.

If a special prism comprising two decentered optical surfaces is used to constitute the second optical element, it becomes easy to make the power of the second optical element asymmetric with respect to the visual axis; this is useful to correct comatic aberrations asymmetrically introduced into an image which lies closer to the image display device as viewed from the visual axis and into an image which lies on the opposite side, and to ensure a clearer image for observation and a wider field angle.

If the second optical element is decentered or tilted with respect to the observer's visual axis, it is possible to correct comatic aberrations asymmetrically introduced into an image which lies closer to the image display device as viewed from the visual axis and into an image which lies on the opposite side, and also possible to allow the optical axis to lie approximately perpendicular to a plane where the image display device is disposed, regardless of the configuration of the lens, special prism, etc.

It is preferable from the viewpoint of effectively reducing the size of the optical system and attaining favorable performance that internal reflection at the first surface of the first optical element after reflection at the second surface should be total reflection. FIGS. 11(a) and 11(b) show the optical path of the first optical element 7. As shown in FIG. 11(a), light rays coming out of a pupil 1 are refracted by the first surface 3 of the first optical element 7, reflected by the second surface 4, which is a concave mirror, and then internally reflected by the first surface 3. If there is a large difference between the height at which upper extra-axial light rays U are reflected by the second surface 4 and the height at which the upper extra-axial light rays U are reflected by the first surface 3 after being reflected by the second surface 4, the overall length of the ocular optical system correspondingly increases, resulting in an increase of the overall size of the ocular optical system. That is, as the difference between the heights of the reflection points decreases, the size of the ocular optical system can be made smaller. In other words, if the size of the ocular optical system is kept constant, as the difference between the heights of the reflection points becomes smaller, the observation field angle can be widened.

However, if the difference between the reflection heights of the upper extra-axial light rays U at the second surface 4 and the first surface 3 is reduced in the ocular optical system of the present invention, as shown in FIG. 11(b), the upper light rays U are reflected at a position higher than a position at which lower extra-axial light rays L are incident on the first surface 3. Accordingly, when the first surface 3 is not a totally reflecting surface, the refracting region of the first surface 3 overlaps the mirror-coat region M'. Consequently, the lower light rays L are undesirably blocked.

If the internal reflection at the first surface 3 satisfies the condition for total reflection, the first surface 3 need not be mirror-coated. Therefore, even if the upper light rays U reflected from the second surface 4 and the lower light rays L incident on the first surface 3 interfere with each other at the first surface 3, the upper and lower light rays U and L can perform their original functions.

At the second surface 4, which is a decentered concave mirror, as the reflection angle becomes larger, comatic aberration occurs to a larger extent. However, in a case where light rays are totally reflected by the first surface 3, the angle of reflection at the second surface 4 can be reduced. Therefore, it is possible to effectively suppress the occurrence of comatic aberration at the second surface 4.

It should be noted that, when the internal reflection at the first surface does not satisfy the condition for total reflection, the internally reflection region of the first surface needs to be mirror-coated.

Further, an effective way of correcting aberration is to form any one of the first, second and third surfaces of the first optical element into a decentered aspherical surface. This is an important condition for correcting comatic aberrations, particularly higher-order comatic aberrations and coma flare, produced by the second surface, which is decentered in a direction Y or tilted with respect to the visual axis in a coordinate system defined, as described later, such that the direction of the observer's visual axis is taken as a Z-axis, where the direction toward the ocular optical system from the origin is defined as a positive direction; the vertical direction (as viewed from the observer's eyeball) which perpendicularly intersects the observer's visual axis is taken as a Y-axis, where the upward direction is defined as a position direction; and the horizontal direction (as viewed from the observer's eyeball) which perpendicularly intersects the observer's visual axis is taken as an X-axis, where the leftward direction is defined as a positive direction.

In an image display apparatus which uses an ocular optical system of the type having a decentered or tilted reflecting surface in front of an observer's eyeball as in the present invention, light rays are obliquely incident on the reflecting surface even on the visual axis. Therefore, complicated comatic aberration is produced. The complicated comatic aberration increases as the tilt angle of the reflecting surface becomes larger. However, if it is intended to realize a compact and wide-field image display apparatus, it is difficult to ensure an observation image having a wide field angle unless the amount of eccentricity (displacement) or the tilt angle is increased to a certain extent because of the interference between the image display device and the optical path. Accordingly, as the field angle of an image display apparatus becomes wider and the size thereof becomes smaller, the tilt angle of the reflecting surface becomes larger. As a result, how to correct higher-order comatic aberrations becomes a serious problem.

To correct such complicated comatic aberrations, any one of the first, second and third surfaces constituting the first optical element is formed into a decentered aspherical surface. By doing so, the power of the optical system can be made asymmetric with respect to the visual axis. Further, the effect of the aspherical surface can be utilized for off-axis aberration. Accordingly, it becomes possible to effectively correct comatic aberrations, including axial aberration.

Further, it is important that any one of the first, second and third surfaces of the first optical element should be a non-rotationally symmetric aspherical surface such as a three-dimensional free surface having only one plane of symmetry or an anamorphic surface having only two planes of symmetry. That is, any one of the three surfaces should be a surface in which the curvature radius in the YZ-plane and the curvature radius in the XZ-plane, which perpendicularly intersects the YZ-plane, are different from each other. This is a condition for correcting aberrations which occur because the second surface is decentered or tilted with respect to the visual axis. In general, if a spherical surface is decentered, the curvature relative to light rays incident on the surface in the plane of incidence and that in a plane perpendicularly intersecting the incidence plane differ from each other. Therefore, in an ocular optical system where a reflecting surface is disposed in front of an observer's eyeball in such a manner as to be decentered or tilted with respect to the visual axis as in the present invention, an image on the visual axis lying in the center of the observation image is also astigmatically aberrated for the reason stated above. In order to correct the axial and other astigmatic aberrations, it is important that any one of the first, second and third surfaces of the first optical element should be formed so that the radius of curvature in the plane of incidence and that in a plane perpendicularly intersecting the incidence plane are different from each other. By doing so, astigmatic aberrations, including axial aberration, can be corrected, and it is possible to provide a clear image for observation.

Assuming that $R_{y2}$ is the radius of curvature in the YZ-plane of the second surface of the first optical element, and $R_{x2}$ is the radius of curvature in the XZ-plane of the second surface, it is preferable to satisfy the following condition:

$$R_{y2}/R_{x2} \geq 1 \qquad (1)$$

The above expression (1) is a condition for correcting aberrations, particularly axial and other astigmatic aberrations, which occur because the second surface is tilted with respect to the visual axis. In general, as the field angle becomes larger, higher-order astigmatic aberrations appear. In a convex lens system, as the field angle becomes larger, the meridional image increases in the negative direction, whereas the sagittal image increases in the positive direction. In order to correct these astigmatic aberrations, it is necessary to arrange the optical system such that the power in the meridional plane is reduced, whereas the power in the sagittal plane is increased. Accordingly, with regard to the radius of curvature of one surface, the radius of curvature should be increased in the direction Y and reduced in the direction X.

In the ocular optical system of the present invention, a principal surface having positive power is the second surface, which is a reflecting surface. Therefore, it is preferable to allow the second surface to satisfy the condition (1) rather than to arrange another surface to have a difference between the curvature radii in the YZ- and XZ-planes. That is, astigmatism correction can be made even more effectively by allowing the second surface to satisfy the condition (1); this is preferable in terms of aberration correction.

Next, an effective way of correcting aberrations is to form the first surface of the first optical element into a reflecting surface having a convex surface directed toward the second surface. Because the second surface is a principal reflecting surface having positive power in the whole ocular optical system, it produces curvature of field to a considerable extent in addition to the above-described comatic aberration. The negative comatic aberration produced by the second surface can be corrected by allowing the first surface to have negative power so that the first surface produces comatic aberration which is opposite in sign to the comatic aberration produced by the second surface. Further, the curvature of field produced by the second surface can be simultaneously corrected by allowing the third surface to produce curvature of field which is opposite in sign to that produced by the second surface.

In order for the first surface to perform total reflection as internal reflection, it is necessary to satisfy the condition that reflection angles of all light rays at the first surface are not smaller than the critical angle $\theta_r=\sin^{-1}(1/n)$ (where n is the refractive index of a medium constituting the optical system). In the case of n=1.5, for example, $\theta_r$=41.81°, and a reflection angle not smaller than it is necessary. This will be explained below with reference to FIGS. 12(a) and 12(b).

FIGS. 12(a) and 12(b) show a part of the first optical element in which light rays are first reflected by the second surface 4 and then internally reflected by the first surface 3. FIG. 12(a) shows the way in which reflection takes place when the first surface 3 is concave toward the second surface 4. FIG. 12(b) shows the way in which reflection takes place when the first surface 3 is convex toward the second surface 4. After being reflected by the second surface 4, each light ray is directed downward at a certain angle. In a case where the first surface 3 is a reflecting surface having a concave surface directed toward the second surface 4, as shown in FIG. 12(a), lines S normal to the first surface 3 convergently extend toward the second surface 4. Because a lower light ray L reflected by the second surface 4 is incident on the first surface 3 in a direction along the line normal to the first surface 3, the reflection angle γ at the first surface 3 cannot be made large. That is, it is difficult to satisfy the condition for total reflection with respect to all light rays reflected by the first surface 3. Conversely, in a case where the first surface 3 is convex toward the second surface 4, as shown in FIG. 12(b), lines S' normal to the first surface 3 divergently extend toward the second surface 4. Accordingly, the reflection angle γ' can be effectively increased even for the lower light ray L. Thus, the condition for total reflection at the first surface 3 can be readily satisfied at a wide field angle.

Moreover, the arrangement in which the first surface 3 has a convex surface directed toward the second surface 4 enlarges the space for disposing the second optical element between the first optical element and the observer's face. Therefore, the arrangement is useful to dispose the second optical element.

Further, it is desirable for either one of the first and third surfaces of the first optical element to be tilted or decentered with respect to the visual axis. By tilting or decentering either one of the first and third surfaces, it becomes possible to correct comatic aberrations asymmetrically introduced into an image which lies closer to the image display device as viewed from the visual axis and into an image which lies on the opposite side, and also possible to dispose the image display device at a plane which is approximately perpendicular to the optical axis after reflection at the second surface. This is effective when an image display device which is inferior in viewing angle characteristics is used.

Further, it is desirable to satisfy the following condition:

$$5°<\alpha<30° \quad (2)$$

where α is an angle formed between a line normal to the second surface of the first optical element and an axial principal ray.

The above expression (2) is a condition for disposing the ocular optical system and the image display device in the image display apparatus according to the present invention at appropriate positions, respectively. If the angle α is not larger than the lower limit of the condition (2), i.e. 5°, when light rays reflected by the second surface are incident on the first surface inside the first optical element so as to be internally reflected by the first surface, the angle of incidence is excessively small, that is, smaller than the critical angle. Accordingly, it becomes difficult to satisfy the condition for total reflection. If the angle α is not smaller than the upper limit of the condition (2), i.e. 30°, the reflection angle at the second surface becomes undesirably large, and the amount of comatic aberration produced by the second surface increases to such an extent that it cannot satisfactorily be corrected by another surface. Moreover, the reflection points on the second and first surfaces are excessively away from each other, and the first optical element becomes exceedingly large.

In the foregoing arrangement, the display surface of the image display device is preferably tilted with respect to the observer's visual axis. In a case where a refracting surface or a reflecting surface which constitutes an optical element is decentered or tilted, the refraction or reflection angle of light rays from the pupil at the refracting or reflecting surface may vary according to the image height, causing the image surface to be tilted with respect to the visual axis. In such a case, the tilt of the image surface can be corrected by tilting the display surface of the image display device with respect to the visual axis.

Further, it becomes possible for the observer to see a stable observation image by providing a device for positioning both the image display device and the ocular optical system with respect to the observer's head.

By allowing both the image display device and the ocular optical system to be fitted to the observer's head with a supporting device, it becomes possible for the observer to see the observation image in a desired posture and from a desired direction.

Further, it becomes possible for the observer to see the observation image with both eyes without fatigue by providing a device for supporting at least two image display apparatuses at a predetermined spacing. Moreover, if images with a disparity therebetween are displayed on the right and left image display surfaces, and these images are observed with both eyes, it is possible to enjoy viewing a stereoscopic image.

Furthermore, if the ocular optical system is arranged to form an image of an object at infinity with the image display device surface in the ocular optical system defined as an image surface, the ocular optical system can be used as an imaging optical system, e.g. a finder optical system for a camera such as that shown in FIG. 15.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 17 shows an optical system of another conventional image display apparatus.

FIGS. 18(a) and 18(b) show an optical system of still another conventional image display apparatus.

DESCRIPTION OF THE PREFERRED EMBODIMENTS

Examples 1 to 10 of the image display apparatus according to the present invention will be described below with reference to FIGS. 1 to 10, which are sectional views of ocular optical systems designed for a single eye according to Examples 1 to 10.

Figure 1:
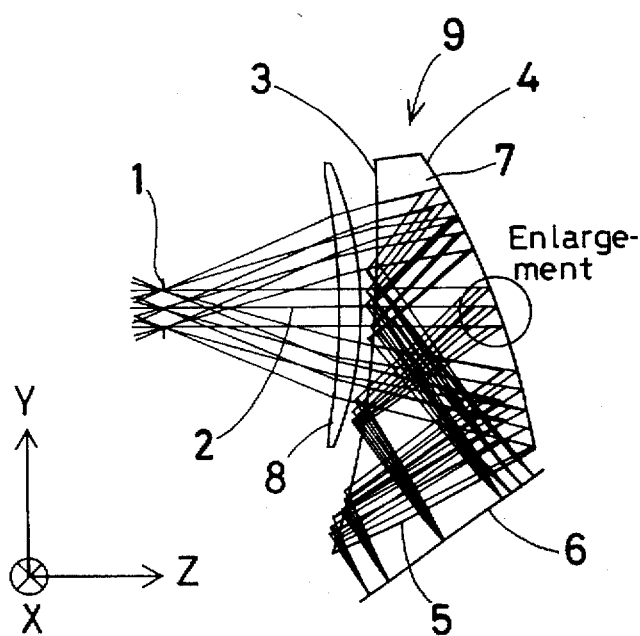
FIG. 1 illustrates an optical ray trace of Example 1 of an ocular optical system in the image display apparatus according to the present invention.
Figure 1A:
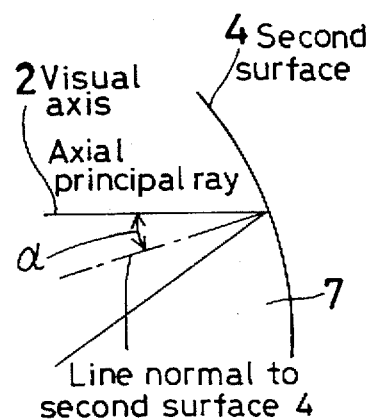

Constituent parameters of Examples 1 to 10 will be shown later. In the following description, surface Nos. are shown as ordinal numbers in backward tracing from an observer's pupil position 1 toward an ocular optical system 9. A coordinate system is defined as follows: As shown in FIG. 1, with the observer's iris position 1 defined as the origin, the direction of an observer's visual axis 2 is taken as a Z-axis, where the direction toward the ocular optical system 9 from the origin is defined as a positive direction. The vertical direction (as viewed from the observer's eyeball) which perpendicularly intersects the observer's visual axis 2 is taken as a Y-axis, where the upward direction is defined as a position direction. The horizontal direction (as viewed from the observer's eyeball) which perpendicularly intersects the observer's visual axis 2 is taken as an X-axis, where the leftward direction is defined as a positive direction. That is, the plane of the figure is defined as a YZ-plane, and a plane which is perpendicular to the plane of the figure is defined as an XZ-plane. Further, it is assumed that the optical axis is bent in the YZ-plane, which is parallel to the plane of the figure.

In the constituent parameters (shown later), regarding each surface for which displacements (eccentricities) Y and Z and tilt angle θ are shown, the displacement Y is a distance by which the vertex of the surface decenters in the Y-axis direction from the surface No. 1 (pupil position 1), which is a reference surface. The displacement Z is a distance by which the vertex of the surface decenters in the Z-axis direction from the surface No. 1. The tilt angle θ is the angle of inclination of the central axis of the surface from the Z-axis. In this case, positive θ means counterclockwise rotation. It should be noted that a surface without indication of displacements Y, Z and tilt angle θ is coaxial with respect to the preceding surface. However, regarding the surface No. 4 in Example 5, the surface No. 3, which precedes the surface No. 4, is defined as a reference surface, and a position that is away from the surface No. 3 by the given surface separation (1.000) along the central axis of the surface No. 3 is defined as a reference point. A point that is away from the reference point by the given displacement Y is the vertex of the surface No. 4. An axis that is inclined at the given tilt angle θ from the central axis of the surface No. 3 is the central axis of the surface No. 4.

Regarding surface separations, the surface separation of the surface No. 2 is the distance from the surface No. 1 along the Z-axis, and a point on the surface No. 2 that lies on the Z-axis is defined as a reference point. A point that is away from the reference point by the given displacement Y is the vertex of the surface No. 2. Regarding the coaxial portion, the surface separation is the axial distance from the surface concerned to the next surface (however, the surface Nos. 3 and 4 in Example 5 are not coaxial with respect to each other, as stated above). It should be noted that surface separations are shown with the direction of backward tracing along the optical axis defined as a positive direction.

The non-rotationally symmetric aspherical configuration of each surface may be expressed in the coordinate system defining the surface as follows:

$$Z = [(X^2/R_x) + (Y^2/R_y)]/$$
$$[1 + \{1 - (1 + K_x)(X^2/R_x^2) -$$
$$(1 + K_y)(Y^2/R_y^2)\}^{1/2}] +$$
$$AR[(1-AP)X^2 + (1+AP)Y^2]^2 +$$
$$BR[(1-BP)X^2 + (1+BP)Y^2]^3$$

where $R_y$ is the paraxial curvature radius of each surface in the YZ-plane (the plane of the figure); $R_x$ is the paraxial curvature radius in the XZ-plane; $K_x$ is the conical coefficient in the XZ-plane; $K_y$ is the conical coefficient in the YZ-plane; AR and BR are 4th- and 6th-order aspherical coefficients, respectively, which are rotationally symmetric with respect to the Z-axis; and AP and BP are 4th- and 6th-order aspherical coefficients, respectively, which are rotationally asymmetric with respect to the Z-axis.

It should be noted that the non-rotationally symmetric aspherical configuration may be a three-dimensional free surface defined by the following equation, where $C_n$ (n is an integer) is a coefficient:

$$Z = C_2 + C_3y + C_4x + C_5y^2 + C_6yx + C_7x^2 +$$
$$C_8y^3 + C_9y^2x + C_{10}yx^2 + C_{11}x^3 +$$
$$C_{12}y^4 + C_{13}y^3x + C_{14}y^2x^2 + C_{15}yx^3 + C_{16}x^4 +$$
$$C_{17}y^5 + C_{18}y^4x + C_{19}y^3x^2 + C_{20}y^2x^3 + C_{21}yx^4 + C_{22}x^5 +$$
$$C_{23}y^6 + C_{24}y^5x + C_{25}y^4x^2 + C_{26}y^3x^3 + C_{27}y^2x^4 +$$
$$C_{28}yx^5 + C_{29}y^6 + C_{30}y^7 + C_{31}y^6x + C_{32}y^5x^2 +$$
$$C_{33}y^4x^3 + C_{34}y^3x^4 +$$
$$C_{35}y^2x^5 + C_{36}yx^6 + C_{37}x^7$$

The rotationally symmetric aspherical configuration of each surface may be expressed by, $$Z = [(h^2/R)/[1 + \{1 - (1+K)(h^2/R^2)\}^{1/3}] + Ah^4 + Bh^6$$

where R is the paraxial curvature radius; K is the conical coefficient; A and B are 4th- and 6th-order aspherical coefficients, respectively; and h is $h^2 = X^2 + Y^2$.

It should be noted that the refractive index of the medium between surfaces is expressed by the refractive index for the spectral d-line. Lengths are given in millimeters.

The following examples are all ocular optical systems 9 for the right eye. An ocular optical system for the left eye can be realized by disposing the constituent optical elements of each example in symmetrical relation to the ocular optical system for the right eye with respect to the YZ-plane.

In an actual apparatus, needless to say, the direction in which the optical axis is bent by the ocular optical system 9 may be any of the upward, downward and sideward directions of the observer.

In each sectional view, reference numeral 1 denotes an observer's pupil position, 2 an observer's visual axis, 3 a first surface of a first optical element, 4 a second surface of the first optical element, 5 a third surface of the first optical element, and 6 an image display device. Reference numeral 7 denotes the first optical element having the first, second and third surfaces 3, 4 and 5. Reference numeral 8 denotes a second optical element, and reference numeral 9 denotes an ocular optical system.

The actual path of light rays in each example is as follows: In Example 1, for instance, a bundle of light rays emitted from the image display device 6 enters the ocular optical system 9 while being refracted by the third surface 5 of the first optical element 7. The incident ray bundle is internally reflected by the first surface 3 and then reflected by the second surface 4. The reflected ray bundle is incident on the first surface 3 and refracted thereby so as to be projected through the second optical element 8 into the observer's eyeball with the observer's iris position or eyeball rolling center as the exit pupil 1.

EXAMPLE 1

In this example, as shown in the sectional view of FIG. 1, the horizontal field angle is 55°, while the vertical field angle is 42.7°, and the pupil diameter is 4 millimeters.

In the constituent parameters (shown later), the surface Nos. 4, 5, 6, 7 and 8 are each given displacements in the directions Y and Z and a tilt angle. The surface Nos. 2, 3 and 7 are spherical surfaces, and the surface Nos. 4, 5 and 6 are anamorphic aspherical surfaces. The second optical element 8 is a single positive lens which is not decentered with respect to the observer's visual axis 2.

EXAMPLE 2

Figure 2:
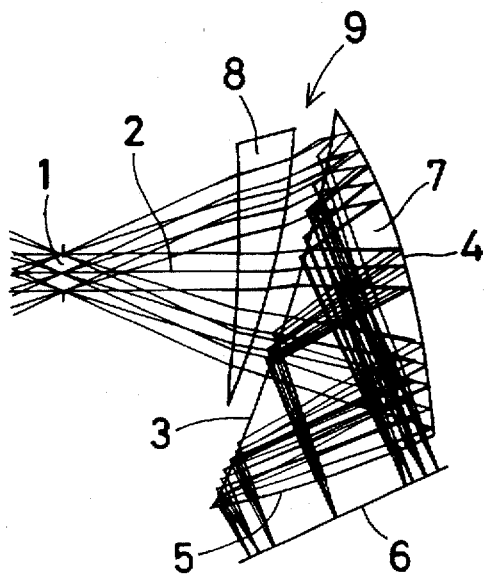
FIG. 2 illustrates an optical ray trace of Example 2 of an ocular optical system in the image display apparatus according to the present invention.

In this example, as shown in the sectional view of FIG. 2, the horizontal field angle is 60°, while the vertical field angle is 46.8°, and the pupil diameter is 4 millimeters.

In the constituent parameters (shown later), the surface Nos. 2, 4, 5, 6, 7 and 8 are each given displacements in the directions Y and Z and a tilt angle. The surface Nos. 2 and 7 are spherical surfaces, and the surface No. 3 is a rotationally symmetric aspherical surface. The surface Nos. 4, 5 and 6 are anamorphic aspherical surfaces. The second optical element 8 is a single positive lens which is decentered with respect to the observer's visual axis 2.

EXAMPLE 3

Figure 3:
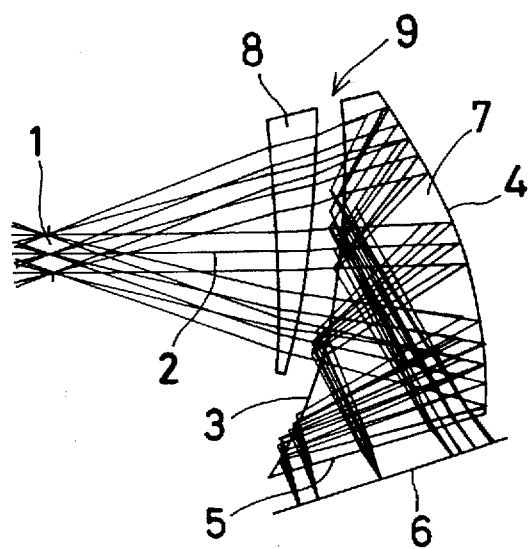
FIG. 3 illustrates an optical ray trace of Example 3 of an ocular optical system in the image display apparatus according to the present invention.

In this example, as shown in the sectional view of FIG. 3, the horizontal field angle is 50°, while the vertical field angle is 39.5°, and the pupil diameter is 4 millimeters.

In the constituent parameters (shown later), the surface Nos. 2, 3, 4, 5, 6, 7 and 8 are each given displacements in the directions Y and Z and a tilt angle. The surface Nos. 2, 3 and 7 are spherical surfaces, and the surface Nos. 4, 5 and 6 are anamorphic aspherical surfaces. The second optical element 8 is a decentered prism comprising two surfaces which are decentered with respect to the observer's visual axis 2.

EXAMPLE 4

Figure 4:
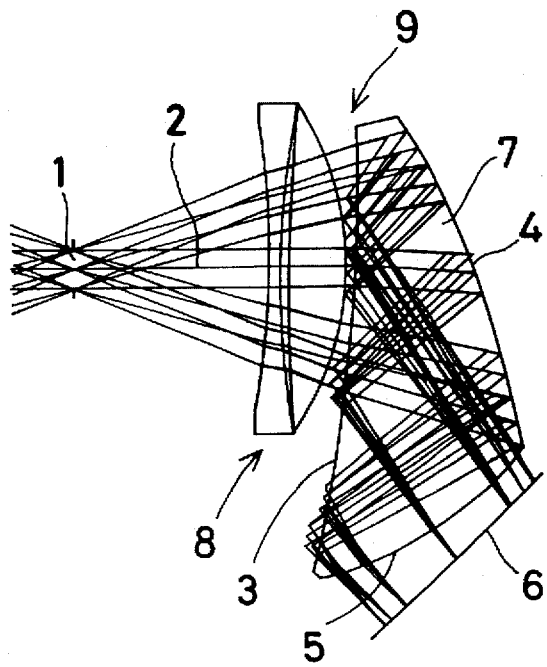
FIG. 4 illustrates an optical ray trace of Example 4 of an ocular optical system in the image display apparatus according to the present invention.

In this example, as shown in the sectional view of FIG. 4, the horizontal field angle is 55°, while the vertical field angle is 42.6°, and the pupil diameter is 4 millimeters.

In the constituent parameters (shown later), the surface Nos. 6, 7, 8, 9 and 10 are each given displacements in the directions Y and Z and a tilt angle. The surface Nos. 2, 3, 4, 5 and 9 are spherical surfaces, and the surface Nos. 6, 7 and 8 are anamorphic aspherical surfaces. The second optical element 8 comprises two lenses which are not decentered with respect to the observer's visual axis 2.

EXAMPLE 5

Figure 5:
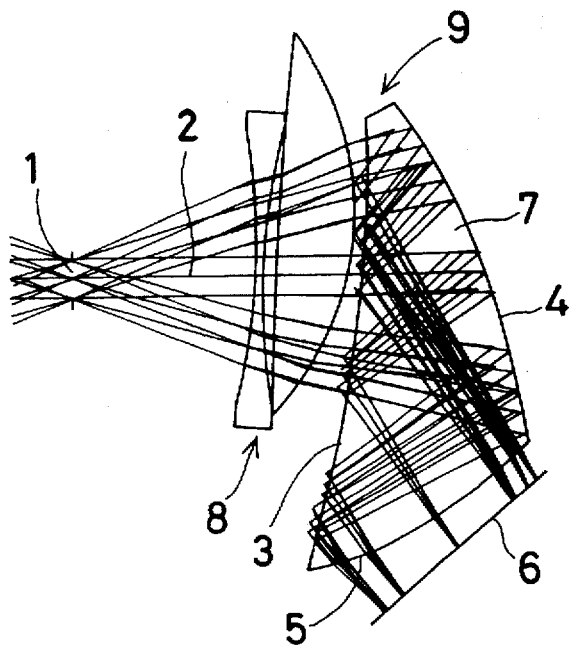
FIG. 5 illustrates an optical ray trace of Example 5 of an ocular optical system in the image display apparatus according to the present invention.

In this example, as shown in the sectional view of FIG. 5, the horizontal field angle is 55°, while the vertical field angle is 42.6°, and the pupil diameter is 4 millimeters.

In the constituent parameters (shown later), the surface Nos. 2, 4, 6, 7, 8, 9 and 10 are each given displacements in the directions Y and Z and a tilt angle. The displacement and tilt angle of the surface No. 4 are quantities measured from the surface No. 3. The surface Nos. 2, 3, 4 and 5 are spherical surfaces, and the surface Nos. 6, 7, 8 and 9 are anamorphic aspherical surfaces. The second optical element 8 comprises two lenses which are decentered with respect to the observer's visual axis 2.

EXAMPLE 6

Figure 6:
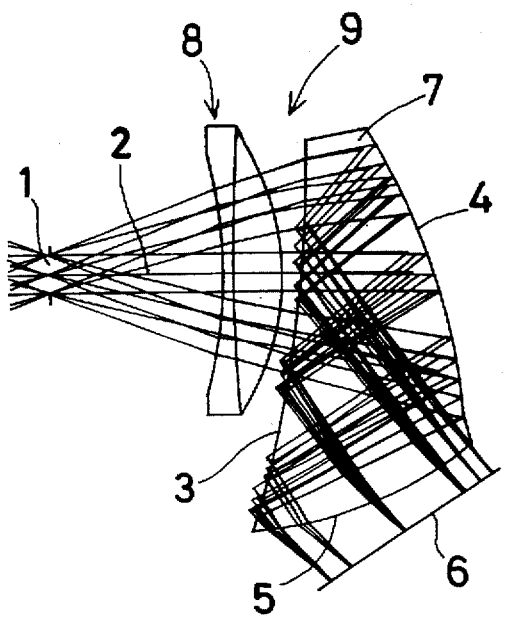
FIG. 6 illustrates an optical ray trace of Example 6 of an ocular optical system in the image display apparatus according to the present invention.

In this example, as shown in the sectional view of FIG. 6, the horizontal field angle is 52°, while the vertical field angle is 40.2°, and the pupil diameter is 4 millimeters.

In the constituent parameters (shown later), the surface Nos. 5, 6, 7, 8 and 9 are each given displacements in the directions Y and Z and a tilt angle. The surface Nos. 2, 3 and 4 are spherical surfaces, and the surface Nos. 5, 6, 7 and 8 are anamorphic aspherical surfaces. The second optical element 8 is a cemented lens which is not decentered with respect to the observer's visual axis 2.

EXAMPLE 7

Figure 7:
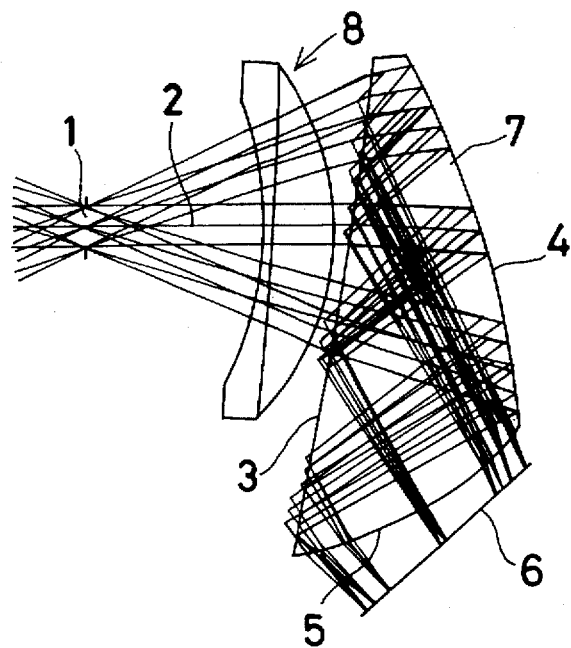
FIG. 7 illustrates an optical ray trace of Example 7 of an ocular optical system in the image display apparatus according to the present invention.

In this example, as shown in the sectional view of FIG. 7, the horizontal field angle is 60°, while the vertical field angle is 46.8°, and the pupil diameter is 4 millimeters.

In the constituent parameters (shown later), the surface Nos. 2, 5, 6, 7, 8 and 9 are each given displacements in the directions Y and Z and a tilt angle. The surface Nos. 2 and 3 are spherical surfaces, and the surface No. 4 is a rotationally symmetric aspherical surface. The surface Nos. 5, 6, 7 and 8 are anamorphic aspherical surfaces. The second optical element 8 is a cemented lens which is decentered with respect to the observer's visual axis 2.

EXAMPLE 8

Figure 8:
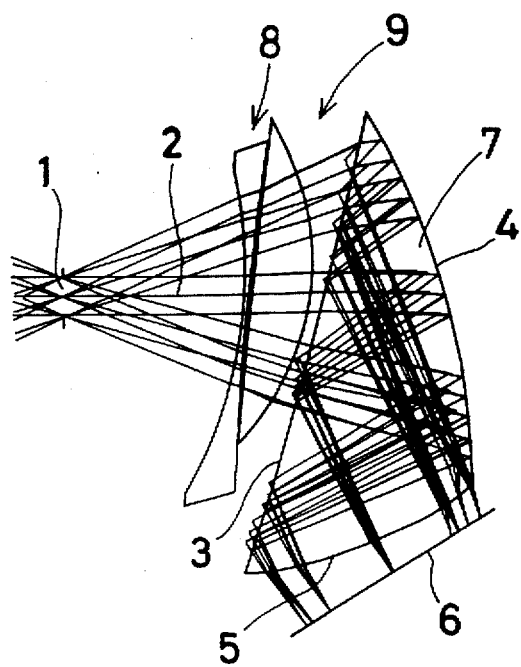
FIG. 8 illustrates an optical ray trace of Example 8 of an ocular optical system in the image display apparatus according to the present invention.

In this example, as shown in the sectional view of FIG. 8, the horizontal field angle is 60°, while the vertical field angle is 46.8°, and the pupil diameter is 4 millimeters.

In the constituent parameters (shown later), the surface Nos. 2, 3, 4, 6, 7, 8, 9 and 10 are each given displacements in the directions Y and Z and a tilt angle. The surface Nos. 2, 3, 4 and 9 are spherical surfaces, and the surface No. 5 is a rotationally symmetric aspherical surface. The surface Nos. 6, 7 and 8 are anamorphic aspherical surfaces. The second optical element 8 comprises a decentered prism composed of two surfaces which are decentered with respect to the observer's visual axis 2, and a decentered positive lens.

EXAMPLE 9

Figure 9:
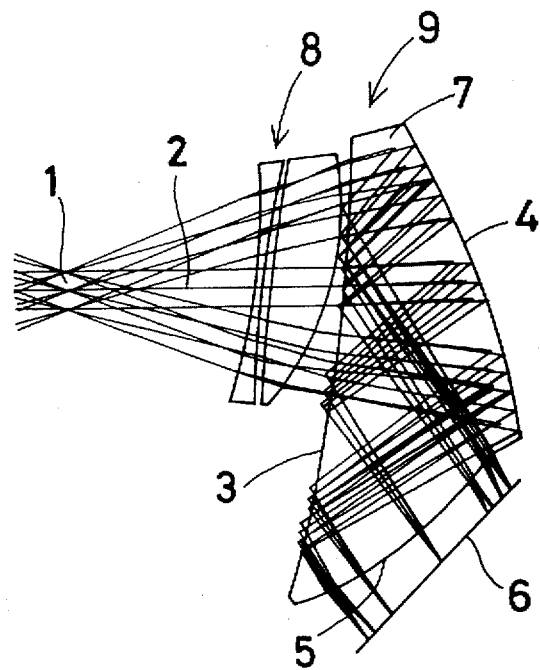
FIG. 9 illustrates an optical ray trace of Example 9 of an ocular optical system in the image display apparatus according to the present invention.

In this example, as shown in the sectional view of FIG. 9, the horizontal field angle is 52°, while the vertical field angle is 40.2°, and the pupil diameter is 4 millimeters.

In the constituent parameters (shown later), the surface Nos. 2, 3, 4, 5, 6, 7, 8, 9 and 10 are each given displacements in the directions Y and Z and a tilt angle. The surface Nos. 2, 3, 4 and 5 are spherical surfaces, and the surface Nos. 6, 7, 8 and 9 are anamorphic aspherical surfaces. The second optical element 8 comprises two decentered prisms each composed of two surfaces which are decentered with respect to the observer's visual axis 2.

EXAMPLE 10

Figure 10:
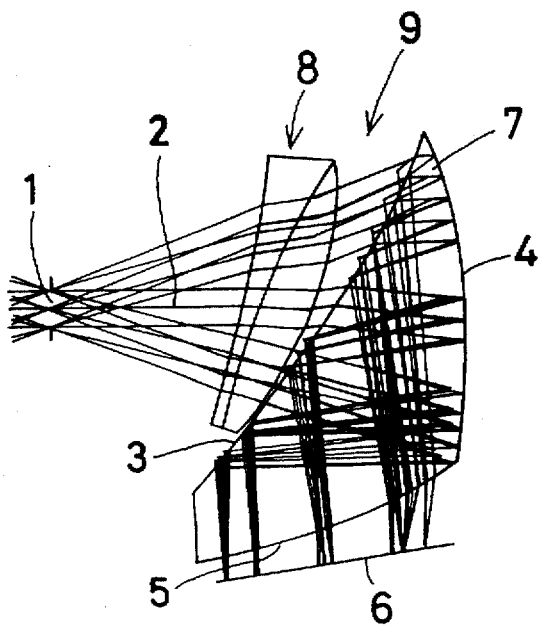
FIG. 10 illustrates an optical ray trace of Example 10 of an ocular optical system in the image display apparatus according to the present invention.
Figure 11A:
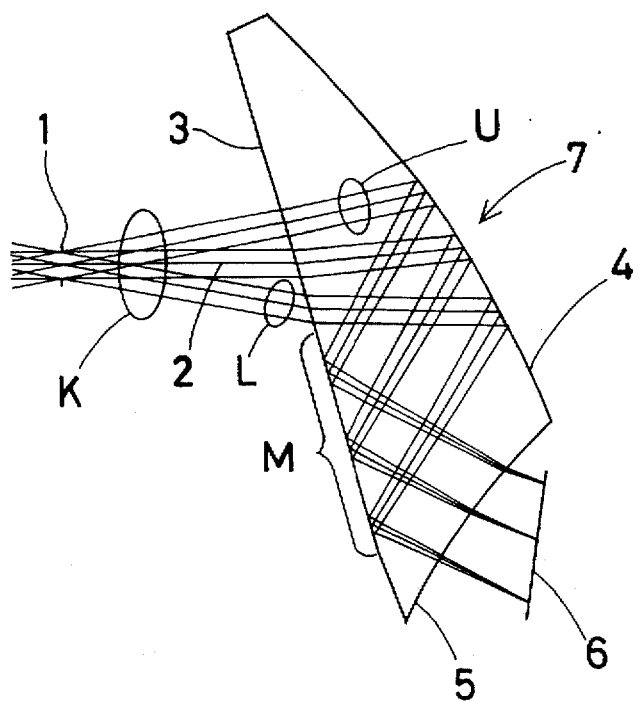
FIGS. 11(a) and 11(b) are views used to explain internal reflection at a first surface of a first optical element according to the present invention.
Figure 11B:
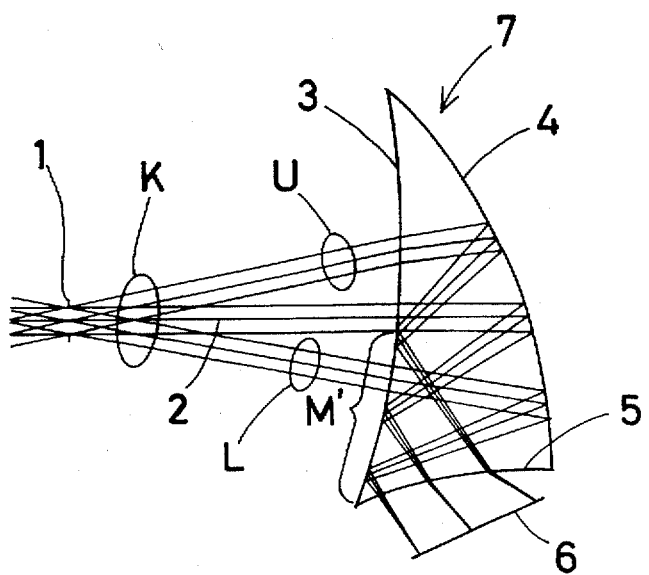
Figure 12A:
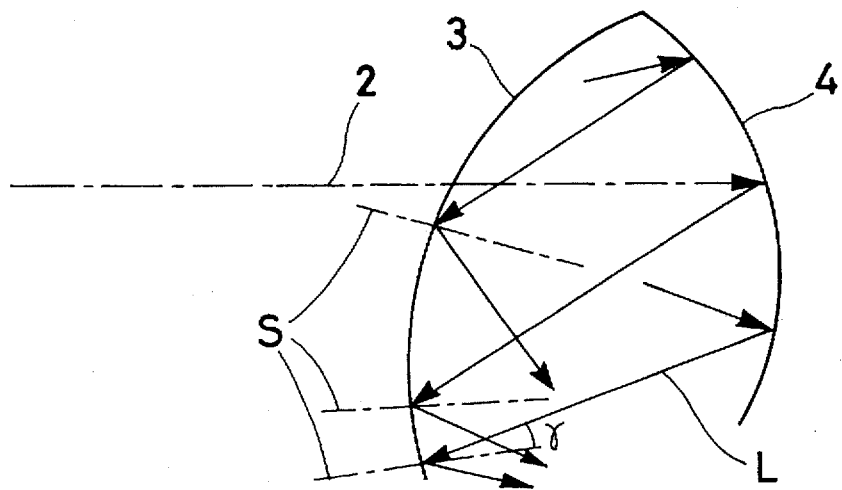
FIGS. 12(a) and 12(b) are views used to explain the relationship between total reflection and the configuration of the first surface of the first optical element according to the present invention.
Figure 12B:
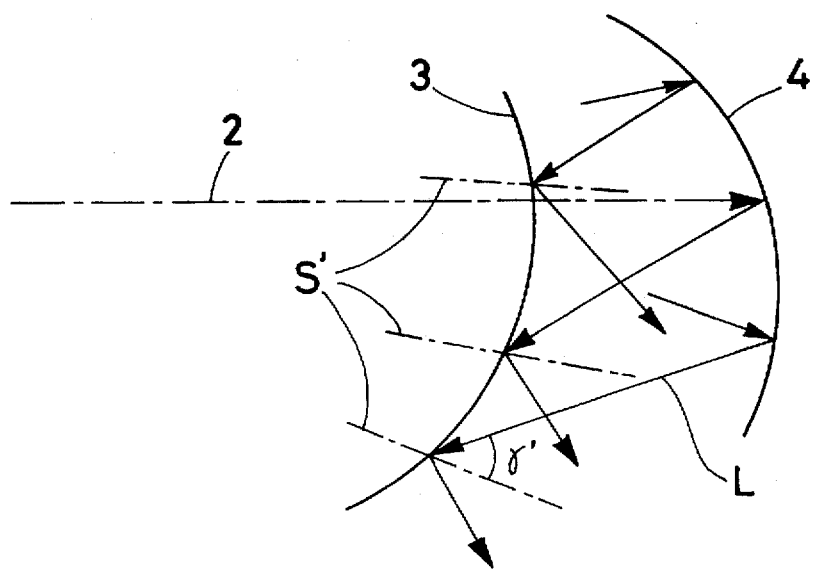

In this example, as shown in the sectional view of FIG. 10, the horizontal field angle is 52°, while the vertical field angle is 40.2°, and the pupil diameter is 4 millimeters.

In the constituent parameters (shown later), the surface Nos. 2, 3, 4, 5, 6, 7, 8 and 9 are each given displacements in the directions Y and Z and a tilt angle. The surface Nos. 2, 3, 4 and 8 are spherical surfaces, and the surface Nos. 5, 6 and 7 are anamorphic aspherical surfaces. The second optical element 8 is a cemented decentered prism composed of three surfaces which are decentered with respect to the observer's visual axis 2.

Constituent parameters of the above-described Examples 1 to 10 are as follows:

EXAMPLE 1

| Surface No. | | Radius of curvature | Surface separation | Refractive index (Displacement) | | Abbe's No. (Tilt angle) |
|---|---|---|---|---|---|---|
| 1 | | ∞ (pupil) | 20.000 | | | |
| 2 | | −79.853 | 2.252 | 1.4870 | | 70.40 |
| 3 | | −42.976 | | | | |
| 4 | $R_y$ | −103.131 | | 1.4922 | | 57.50 |
|   | $R_x$ | −55.078 | | Y −13.000 | θ | −9.92° |
|   | $K_y$ | 0 | | Z 22.803 | | |
|   | $K_x$ | 0 | | | | |
|   | AR | $1.49833 \times 10^{-6}$ | | | | |
|   | BR | $-1.78408 \times 10^{-16}$ | | | | |
|   | AP | −0.240217 | | | | |
|   | BP | 61.7509 | | | | |
| 5 | $R_y$ | −64.331 | | 1.4922 | | 57.50 |
|   | $R_x$ | −54.177 | | Y 9.640 | θ | 28.26° |
|   | $K_y$ | −1.121126 | | Z 33.376 | | |
|   | $K_x$ | −0.570247 | | Z 33.376 | | |
|   | AR | $-2.16679 \times 10^{-9}$ | | | | |
|   | BR | $-1.65584 \times 10^{-10}$ | | | | |
|   | AP | −1.25356 | | | | |
|   | BP | 0.100173 | | | | |
| 6 | $R_y$ | −103.131 | | 1.4922 | | 57.50 |
|   | $R_x$ | −55.078 | | Y −13.000 | θ | −9.92° |
|   | $K_y$ | 0 | | Z 22.803 | | |
|   | $K_x$ | 0 | | | | |
|   | AR | $1.49833 \times 10^{-6}$ | | | | |
|   | BR | $-1.78408 \times 10^{-16}$ | | | | |
|   | AP | −0.240217 | | | | |
|   | BP | 61.7509 | | | | |
| 7 | | −117.214 | | Y −22.696 | θ | −62.44° |
|   | | | | Z 28.750 | | |
| 8 | | (display device) | | Y −25.525 | θ | −54.51° |
|   | | | | Z 31.891 | | |

(1) $R_{y2}/R_{x2} = 1.187$
(2) $\alpha = 19.81°$

EXAMPLE 2

| Surface No. | | Radius of curvature | Surface separation | | Refractive index (Displacement) | | Abbe's No. (Tilt angle) |
|---|---|---|---|---|---|---|---|
| 1 | | ∞ (pupil) | 19.480 | | | | |
| 2 | | −149.754 | 6.286 | | 1.4957 | | 69.45 |
| | | | | Y | 18.881 | θ | 5.20° |
| 3 | | −46.283 | | | | | |
| | K | −1.076623 | | | | | |
| | A | 6.14511 × $10^{-7}$ | | | | | |
| | B | 1.01183 × $10^{-9}$ | | | | | |
| | C | −1.98655 × $10^{-13}$ | | | | | |
| | D | 1.62809 × $10^{-16}$ | | | | | |
| 4 | $R_y$ | −175.671 | | | 1.4922 | | 57.50 |
| | $R_x$ | −117.764 | | Y | −13.578 | θ | −19.99° |
| | $K_y$ | 0 | | Z | 22.259 | | |
| | $K_x$ | 0 | | | | | |
| | AR | 2.55402 × $10^{-7}$ | | | | | |
| | BR | −3.74933 × $10^{-18}$ | | | | | |
| | AP | 0.0764917 | | | | | |
| | BP | 110.963 | | | | | |
| 5 | $R_y$ | −70.668 | | | 1.4922 | | 57.50 |
| | $R_x$ | −70.320 | | Y | 10.632 | θ | 24.88° |
| | $K_y$ | 0.368755 | | Z | 34.685 | | |
| | $K_x$ | 0.725837 | | | | | |
| | AR | −1.66238 × $10^{-8}$ | | | | | |
| | BR | −1.45872 × $10^{-11}$ | | | | | |
| | AP | −0.63434 | | | | | |
| | BP | 0.563345 | | | | | |
| 6 | $R_y$ | −175.671 | | | 1.4922 | | 57.50 |
| | $R_x$ | −117.764 | | Y | −13.578 | θ | −19.99° |
| | $K_y$ | 0 | | Z | 22.259 | | |
| | $K_x$ | 0 | | | | | |
| | AR | 2.55402 × $10^{-7}$ | | | | | |
| | BR | −3.74933 × $10^{-18}$ | | | | | |
| | AP | 0.0764917 | | | | | |
| | BP | 110.963 | | | | | |
| 7 | | −95.783 | | Y | −22.366 | θ | −69.76° |
| | | | | Z | 29.993 | | |
| 8 | | (display device) | | Y | −26.912 | θ | −64.24° |
| | | | | Z | 30.714 | | |

(1) $R_{y2}/R_{x2} = 1.005$
(2) $\alpha = 16.39°$

EXAMPLE 3

| Surface No. | | Radius of curvature | Surface separation | | Refractive index (Displacement) | | Abbe's No. (Tilt angle) |
|---|---|---|---|---|---|---|---|
| 1 | | ∞ (pupil) | 25.786 | | | | |
| 2 | | −165.163 | | | 1.4870 | | 70.40 |
| | | | | Y | −11.747 | θ | −2.01° |
| 3 | | −121.654 | | Y | 3.341 | θ | −6.23° |
| | | | | Z | 29.353 | | |
| 4 | $R_y$ | −55.794 | | | 1.4922 | | 57.50 |
| | $R_x$ | −48.484 | | Y | −10.647 | θ | −15.52° |
| | $K_y$ | 0 | | Z | 30.994 | | |
| | $K_x$ | 0 | | | | | |
| | AR | 2.12389 × $10^{-6}$ | | | | | |
| | BR | 5.7494 × $10^{-11}$ | | | | | |
| | AP | 0.126125 | | | | | |
| | BP | −2.43702 | | | | | |
| 5 | $R_y$ | −49.476 | | | 1.4922 | | 57.50 |
| | $R_x$ | −49.594 | | Y | 11.351 | θ | 32.78° |
| | $K_y$ | −0.278486 | | Z | 40.764 | | |
| | $K_x$ | −0.139149 | | | | | |
| | AR | 8.59282 × $10^{-8}$ | | | | | |
| | BR | −1.26962 × $10^{-10}$ | | | | | |
| | AP | 1.07792 | | | | | |
| | BP | 0.296405 | | | | | |
| 6 | $R_y$ | −55.794 | | | 1.4922 | | 57.50 |
| | $R_x$ | −48.484 | | Y | −10.647 | θ | −15.52° |
| | $K_y$ | 0 | | Z | 30.994 | | |
| | $K_x$ | 0 | | | | | |
| | AR | 2.12389 × $10^{-6}$ | | | | | |
| | BR | 5.7494 × $10^{-11}$ | | | | | |
| | AP | 0.126125 | | | | | |
| | BP | −2.43702 | | | | | |
| 7 | | ∞ | | Y | −22.420 | θ | −73.34° |
| | | | | Z | 32.189 | | |
| 8 | | (display device) | | Y | −24.662 | θ | −72.14° |
| | | | | Z | 37.110 | | |

(1) $R_{y2}/R_{x2} = 0.9976$
(2) $\alpha = 17.65°$

EXAMPLE 4

| Surface No. | | Radius of curvature | Surface separation | | Refractive index (Displacement) | | Abbe's No. (Tilt angle) |
|---|---|---|---|---|---|---|---|
| 1 | | ∞ (pupil) | 21.987 | | | | |
| 2 | | −118.865 | 1.500 | | 1.7550 | | 27.60 |
| 3 | | 89.963 | 1.000 | | | | |
| 4 | | 237.957 | 5.986 | | 1.5216 | | 66.93 |
| 5 | | −33.550 | | | | | |
| 6 | $R_y$ | −129.446 | | | 1.4922 | | 57.50 |
| | $R_x$ | −73.157 | | Y | −40.574 | θ | −16.62° |
| | $K_y$ | 0 | | Z | 25.428 | | |
| | $K_x$ | 0 | | | | | |
| | AR | 7.70205 × $10^{-7}$ | | | | | |
| | BR | −9.97781 × $10^{-16}$ | | | | | |
| | AP | −0.432542 | | | | | |
| | BP | −12.9518 | | | | | |
| 7 | $R_y$ | −82.878 | | | 1.4922 | | 57.50 |
| | $R_x$ | −67.122 | | Y | 13.975 | θ | 31.78° |
| | $K_y$ | −0.298929 | | Z | 38.277 | | |
| | $K_x$ | 0.058392 | | | | | |
| | AR | 2.68063 × $10^{-11}$ | | | | | |
| | BR | −2.80113 × $10^{-11}$ | | | | | |
| | AP | −32.3471 | | | | | |
| | BP | 0.273867 | | | | | |
| 8 | $R_y$ | −129.446 | | | 1.4922 | | 57.50 |
| | $R_x$ | −73.157 | | Y | −40.574 | θ | −16.62° |
| | $K_y$ | 0 | | Z | 25.428 | | |
| | $K_x$ | 0 | | | | | |
| | AR | −107.70205 × $10^{-7}$ | | | | | |
| | BR | −9.97781 × $10^{-16}$ | | | | | |
| | AP | −0.423542 | | | | | |
| | BP | −12.9518 | | | | | |
| 9 | | −37.443 | | Y | −29.634 | θ | −60.66° |
| | | | | Z | 38.143 | | |
| 10 | | (display device) | | Y | −31.032 | θ | −45.43° |
| | | | | Z | 43.474 | | |

(1) $R_{y2}/R_{x2} = 1.235$
(2) $\alpha = 21.59°$

EXAMPLE 5

| Surface No. | Radius of curvature | Surface separation | | Refractive index (Displacement) | | Abbe's No. (Tilt angle) |
|---|---|---|---|---|---|---|
| 1 | ∞ (pupil) | 20.696 | | | | |
| 2 | −82.564 | 1.500 | | 1.7550 | | 27.60 |
| | | | Y | 0.676 | θ | −3.42° |
| 3 | 108.981 | 1.000 | | | | |
| 4 | 393.428 | 8.356 | | 1.4870 | | 70.40 |

-continued

| Surface No. | | Radius of curvature | Surface separation | Refractive index (Displacement) | | | Abbe's No. (Tilt angle) |
|---|---|---|---|---|---|---|---|
| | | | | (3) | | | |
| 5 | | −30.366 | | Y | 4.887 | θ | −1.01° |
| 6 | $R_y$ | −129.846 | | | 1.4922 | | 57.50 |
| | $R_x$ | −83.680 | | Y | −37.237 | θ | −19.08° |
| | $K_y$ | 0 | | Z | 24.871 | | |
| | $K_x$ | 0 | | | | | |
| | AR | $6.24728 \times 10^{-7}$ | | | | | |
| | BR | $-1.26948 \times 10^{-15}$ | | | | | |
| | AP | −0.382764 | | | | | |
| | BP | −14.9947 | | | | | |
| 7 | $R_y$ | −77.026 | | | 1.4922 | | 57.50 |
| | $R_x$ | −67.502 | | Y | 15.189 | θ | 32.38° |
| | $K_y$ | −0.799083 | | Z | 38.736 | | |
| | $K_x$ | −0.197743 | | | | | |
| | AR | $2.91272 \times 10^{-11}$ | | | | | |
| | BR | $-5.62923 \times 10^{-11}$ | | | | | |
| | AP | −34.9163 | | | | | |
| | BP | 0.180724 | | | | | |
| 8 | $R_y$ | −129.846 | | | 1.4922 | | 57.57 |
| | $R_x$ | −83.680 | | Y | −37.237 | θ | −19.08° |
| | $K_y$ | 0 | | Z | 24.871 | | |
| | $K_x$ | 0 | | | | | |
| | AR | $6.24728 \times 10^{-7}$ | | | | | |
| | BR | $-1.26948 \times 10^{-15}$ | | | | | |
| | AP | −0.382764 | | | | | |
| | BP | −14.9947 | | | | | |
| 9 | $R_y$ | −38.357 | | Y | −28.514 | θ | −63.00° |
| | $R_x$ | −31.922 | | Z | 37.603 | | |
| | $K_y$ | 0.523529 | | | | | |
| | $K_x$ | −0.840712 | | | | | |
| | AR | $3.5341 \times 10^{-8}$ | | | | | |
| | BR | $3.63967 \times 10^{-9}$ | | | | | |
| | AP | −4.65361 | | | | | |
| | BP | 0.035796 | | | | | |
| 10 | | (display device) | | Y | −29.925 | θ | −50.13° |
| | | | | Z | 43.157 | | |

(1) $R_{y2}/R_{x2} = 1.141$
(2) $\alpha = 18.69°$

EXAMPLE 6

| Surface No. | | Radius of curvature | Surface separation | Refractive index (Displacement) | | | Abbe's No. (Tilt angle) |
|---|---|---|---|---|---|---|---|
| 1 | | ∞ (pupil) | 20.000 | | | | |
| 2 | | −48.162 | 1.260 | | 1.7542 | | 28.39 |
| 3 | | 298.682 | 5.073 | | 1.5633 | | 63.67 |
| 4 | | −28.950 | | | | | |
| 5 | $R_y$ | −129.285 | | | 1.4922 | | 57.50 |
| | $R_x$ | −72.238 | | Y | −21.740 | θ | −13.87° |
| | $K_y$ | 0 | | Z | 24.816 | | |
| | $K_x$ | 0 | | | | | |
| | AR | $8.06925 \times 10^{-7}$ | | | | | |
| | BR | $-6.68352 \times 10^{-13}$ | | | | | |
| | AP | −0.34806 | | | | | |
| | BP | −3.2759 | | | | | |
| 6 | $R_y$ | −74.830 | | | 1.4922 | | 57.50 |
| | $R_x$ | −63.752 | | Y | 12.992 | θ | 28.14° |
| | $K_y$ | −0.64052 | | Z | 37.024 | | |
| | $K_x$ | −0.663288 | | | | | |
| | AR | $2.85157 \times 10^{-11}$ | | | | | |
| | BR | $8.19581 \times 10^{-12}$ | | | | | |
| | AP | −17.5479 | | | | | |
| | BP | −0.745979 | | | | | |
| 7 | $R_y$ | −129.285 | | | 1.4922 | | 57.50 |
| | $R_x$ | −72.238 | | Y | −21.740 | θ | −13.87° |
| | $K_y$ | 0 | | Z | 24.816 | | |
| | $K_x$ | 0 | | | | | |

-continued

| Surface No. | | Radius of curvature | Surface separation | Refractive index (Displacement) | | | Abbe's No. (Tilt angle) |
|---|---|---|---|---|---|---|---|
| | AR | $8.06925 \times 10^{-7}$ | | | | | |
| | BR | $-6.68352 \times 10^{-13}$ | | | | | |
| | AP | −0.34806 | | | | | |
| | BP | −3.2759 | | | | | |
| 8 | $R_y$ | −33.933 | | Y | −26.091 | θ | −68.24° |
| | $R_x$ | −34.979 | | Z | 35.251 | | |
| | $K_y$ | −4.225171 | | | | | |
| | $K_x$ | −1.702054 | | | | | |
| | AR | $-1.75169 \times 10^{-8}$ | | | | | |
| | BR | $-2.37517 \times 10^{-10}$ | | | | | |
| | AP | 1.69187 | | | | | |
| | BP | 2.53944 | | | | | |
| 9 | | (display device) | | Y | −28.918 | θ | −55.18° |
| | | | | Z | 39.434 | | |

(1) $R_{y2}/R_{x2} = 1.174$
(2) $\alpha = 18.78°$

EXAMPLE 7

| Surface No. | | Radius of curvature | Surface separation | Refractive index (Displacement) | | | Abbe's No. (Tilt angle) |
|---|---|---|---|---|---|---|---|
| 1 | | ∞ (pupil) | 19.909 | | | | |
| 2 | | −35.930 | 1.000 | | 1.7550 | | 27.60 |
| | | | | Y | −1.936 | θ | −4.23° |
| 3 | | −300.529 | 6.823 | | 1.4870 | | 70.40 |
| 4 | | −25.650 | | | | | |
| | K | −0.232507 | | | | | |
| | A | $-8.04106 \times 10^{-6}$ | | | | | |
| | B | $4.79768 \times 10^{-8}$ | | | | | |
| | C | $-7.91436 \times 10^{-11}$ | | | | | |
| | D | $9.40219 \times 10^{-14}$ | | | | | |
| 5 | $R_y$ | −195.772 | | | 1.4922 | | 57.50 |
| | $R_x$ | −72.455 | | Y | −46.620 | θ | −18.05° |
| | $K_y$ | 0 | | Z | 19.579 | | |
| | $K_x$ | 0 | | | | | |
| | AR | $8.94413 \times 10^{-7}$ | | | | | |
| | BR | $-6.02816 \times 10^{-11}$ | | | | | |
| | AP | −0.474209 | | | | | |
| | BP | −0.45356 | | | | | |
| 6 | $R_y$ | −103.245 | | | 1.4922 | | 57.50 |
| | $R_x$ | −68.051 | | Y | 26.029 | θ | 34.68° |
| | $K_y$ | −0.511742 | | Z | 30.992 | | |
| | $K_x$ | 0.009043 | | | | | |
| | AR | $-5.55272 \times 10^{-8}$ | | | | | |
| | BR | $3.20008 \times 10^{-15}$ | | | | | |
| | AP | −0.9124 | | | | | |
| | BP | 14.3156 | | | | | |
| 7 | $R_y$ | −195.772 | | | 1.4922 | | 57.50 |
| | $R_x$ | −72.455 | | Y | −46.620 | θ | −18.05° |
| | $K_y$ | 0 | | Z | 19.579 | | |
| | $K_x$ | 0 | | | | | |
| | AR | $8.94413 \times 10^{-7}$ | | | | | |
| | BR | $-6.02876 \times 10^{-11}$ | | | | | |
| | AP | −0.474209 | | | | | |
| | BP | −0.45356 | | | | | |
| 8 | $R_y$ | −44.227 | | Y | −32.244 | θ | −64.98° |
| | $R_x$ | −49.141 | | Z | 34.834 | | |
| | $K_y$ | 0 | | | | | |
| | $K_x$ | 0 | | | | | |
| | AR | $-1.20004 \times 10^{-5}$ | | | | | |
| | BR | $1.88314 \times 10^{-8}$ | | | | | |
| | AP | 0.171306 | | | | | |
| | BP | 0.197665 | | | | | |
| 9 | | (display device) | | Y | −34.035 | θ | −48.84° |
| | | | | Z | 40.047 | | |

(1) $R_{y2}/R_{x2} = 1.517$
(2) $\alpha = 20.68°$

EXAMPLE 8

| Surface No. | | Radius of curvature | Surface separation | | Refractive index (Displacement) | | Abbe's No. (Tilt angle) |
|---|---|---|---|---|---|---|---|
| 1 | | ∞ (pupil) | 19.512 | | | | |
| 2 | | −49.872 | | | 1.7550 | | 27.60 |
| | | | | Y | −4.237 | θ | −9.03° |
| 3 | | 304.607 | | Y | −2.183 | θ | −6.69° |
| | | | | Z | 20.210 | | |
| 4 | | 2434.023 | 7.199 | | 1.4872 | | 70.38 |
| | | | | Y | 1.763 | θ | −6.87° |
| | | | | Z | 21.210 | | |
| 5 | | −26.454 | | | | | |
| | K | 0.075972 | | | | | |
| | A | −3.50752 × $10^{-6}$ | | | | | |
| | B | 1.5557 × $10^{-8}$ | | | | | |
| | C | −4.5029 × $10^{-11}$ | | | | | |
| | D | 8.1601 × $10^{-14}$ | | | | | |
| 6 | $R_y$ | −239.813 | | | 1.4922 | | 57.50 |
| | $R_x$ | −107.325 | | Y | −23.334 | θ | −19.34° |
| | $K_y$ | 0 | | Z | 22.267 | | |
| | $K_x$ | 0 | | | | | |
| | AR | 6.06292 × $10^{-7}$ | | | | | |
| | BR | −5.67235 × $10^{-11}$ | | | | | |
| | AP | −0.394276 | | | | | |
| | BP | −0.350307 | | | | | |
| 7 | $R_y$ | −79.714 | | | 1.4922 | | 57.50 |
| | $R_x$ | −68.387 | | Y | 15.276 | θ | 26.56° |
| | $K_y$ | −1.057911 | | Z | 36.376 | | |
| | $K_x$ | −0.712902 | | | | | |
| | AR | −3.98941 × $10^{-8}$ | | | | | |
| | BR | 4.05676 × $10^{-16}$ | | | | | |
| | AP | 0.555763 | | | | | |
| | BP | 24.5123 | | | | | |
| 8 | $R_y$ | −239.813 | | | 1.4922 | | 57.50 |
| | $R_x$ | −107.325 | | Y | −23.334 | θ | −19.34° |
| | $K_y$ | 0 | | Z | 22.267 | | |
| | $K_x$ | 0 | | | | | |
| | AR | 6.06292 × $10^{-7}$ | | | | | |
| | BR | −5.67235 × $10^{-11}$ | | | | | |
| | AP | −0.394276 | | | | | |
| | BP | −0.350307 | | | | | |
| 9 | $R_y$ | −44.609 | | Y | −27.867 | θ | −69.00° |
| | | | | Z | 32.782 | | |
| 10 | | (display device) | | Y | −30.678 | θ | −57.99° |
| | | | | Z | 36.403 | | |

(1) $R_{y2}/R_{x2} = 1.166$
(2) $\alpha = 17.05°$

EXAMPLE 9

| Surface No. | | Radius of curvature | Surface separation | | Refractive index (Displacement) | | Abbe's No. (Tilt angle) |
|---|---|---|---|---|---|---|---|
| 1 | | ∞ (pupil) | 20.979 | | | | |
| 2 | | −81.180 | | | 1.7550 | | 27.60 |
| | | | | Y | −1.731 | θ | −9.33° |
| 3 | | 120.524 | | | | | |
| | | | | Y | 6.045 | θ | −10.91° |
| | | | | Z | 23.111 | | |
| 4 | | 239.193 | | | 1.4870 | | 70.40 |
| | | | | Y | 16.022 | θ | −11.46° |
| | | | | Z | 25.789 | | |
| 5 | | −31.911 | | Y | 4.117 | θ | −8.83° |
| | | | | Z | 30.610 | | |
| 6 | $R_y$ | −212.927 | | | 1.4922 | | 57.50 |
| | $R_x$ | −111.727 | | Y | −29.933 | θ | −13.51° |
| | $K_y$ | 0 | | Z | 25.965 | | |
| | $K_x$ | 0 | | | | | |
| | AR | 7.8596 × $10^{-7}$ | | | | | |
| | BR | −1.43729 × $10^{-10}$ | | | | | |
| | AP | −0.466856 | | | | | |
| | BP | −0.5641 | | | | | |
| 7 | $R_y$ | −82.274 | | | 1.4922 | | 57.50 |
| | $R_x$ | −73.503 | | Y | 20.542 | θ | 34.49° |
| | $K_y$ | −0.796592 | | Z | 35.734 | | |
| | $K_x$ | −0.41765 | | | | | |
| | AR | 2.84643 × $10^{-8}$ | | | | | |
| | BR | −3.60423 × $10^{-11}$ | | | | | |
| | AP | 0.950703 | | | | | |
| | BP | 0.142203 | | | | | |
| 8 | $R_y$ | −212.927 | | | 1.4922 | | 57.50 |
| | $R_x$ | −111.727 | | Y | −29.933 | θ | −13.51° |
| | $K_y$ | 0 | | Z | 25.965 | | |
| | $K_x$ | 0 | | | | | |
| | AR | 7.8596 × $10^{-7}$ | | | | | |
| | BR | −1.43729 × $10^{-10}$ | | | | | |
| | AP | −0.466856 | | | | | |
| | BP | −0.5641 | | | | | |
| 9 | $R_y$ | −47.841 | | Y | −31.220 | θ | −60.97° |
| | $R_x$ | −44.147 | | Z | 32.517 | | |
| | $K_y$ | 0.255389 | | | | | |
| | $K_x$ | −0.586707 | | | | | |
| | AR | 3.86619 × $10^{-8}$ | | | | | |
| | BR | 2.16408 × $10^{-11}$ | | | | | |
| | AP | −0.0617605 | | | | | |
| | BP | −0.855834 | | | | | |
| 10 | | (display device) | | Y | −30.080 | θ | −43.38° |
| | | | | Z | 41.390 | | |

(1) $R_{y2}/R_{x2} = 1.119$
(2) $\alpha = 18.10°$

EXAMPLE 10

| Surface No. | | Radius of curvature | Surface separation | | Refractive index (Displacement) | | Abbe's No. (Tilt angle) |
|---|---|---|---|---|---|---|---|
| 1 | | ∞ (pupil) | 22.579 | | | | |
| 2 | | −123.867 | | | 1.7550 | | 27.60 |
| | | | | Y | 2.005 | θ | −13.23° |
| 3 | | 111.695 | | | 1.5321 | | 66.03 |
| | | | | Y | −4.489 | θ | −20.70° |
| | | | | Z | 22.541 | | |
| 4 | | −38.492 | | Y | 5.974 | θ | −12.15° |
| | | | | Z | 31.892 | | |
| 5 | $R_y$ | −119.606 | | | 1.4922 | | 57.50 |
| | $R_x$ | −129.715 | | Y | −9.196 | θ | −38.02° |
| | $K_y$ | 0 | | Z | 25.946 | | |
| | $K_x$ | 0 | | | | | |
| | AR | 2.39156 × $10^{-7}$ | | | | | |
| | BR | −2.69628 × $10^{-11}$ | | | | | |
| | AP | 0.266789 | | | | | |
| | BP | −0.539994 | | | | | |
| 6 | $R_y$ | −55.132 | | | 1.4922 | | 57.50 |
| | $R_x$ | −76.621 | | Y | 24.171 | θ | 27.49° |
| | $K_y$ | −0.994091 | | Z | 39.885 | | |
| | $K_x$ | −0.05313 | | | | | |
| | AR | −1.88026 × $10^{-8}$ | | | | | |
| | BR | −4.45274 × $10^{-11}$ | | | | | |
| | AP | −0.4921 | | | | | |
| | BP | 0.144836 | | | | | |
| 7 | $R_y$ | −119.606 | | | 1.4922 | | 57.50 |
| | $R_x$ | −129.715 | | Y | −9.196 | θ | −38.02° |
| | $K_y$ | 0 | | Z | 25.946 | | |
| | $K_x$ | 0 | | | | | |
| | AR | 2.39156 × $10^{-7}$ | | | | | |
| | BR | −2.69628 × $10^{-11}$ | | | | | |
| | AP | 0.266789 | | | | | |
| | BP | −0.639994 | | | | | |
| 8 | | −66.546 | | Y | −25.148 | θ | −71.27° |
| | | | | Z | 29.239 | | |

-continued

| Surface No. | Radius of curvature | Surface separation | Refractive index (Displacement) | Abbe's No. (Tilt angle) |
|---|---|---|---|---|
| 9 | (display device) | | Y  −28.406<br>Z   31.391 | θ  −81.07° |

(1) $R_{y2}/R_{x2} = 0.720$
(2) $\alpha = 9.04°$

Figure 13:
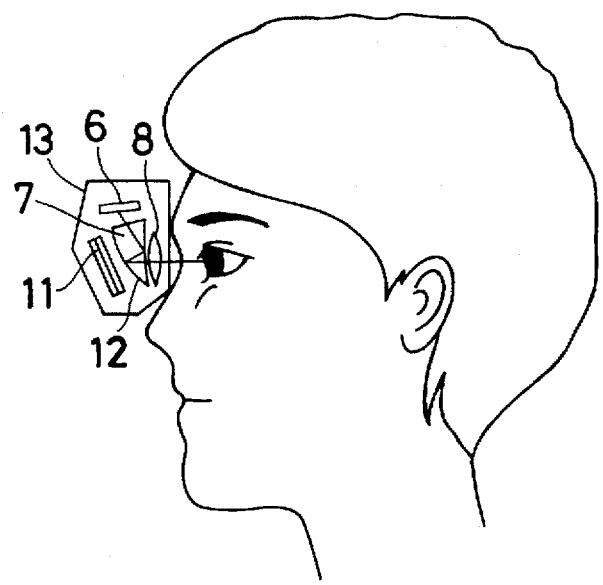
FIGS. 13(a) and 13(b) are sectional and perspective views showing a head-mounted image display apparatus according to the present invention.
Figure 13:
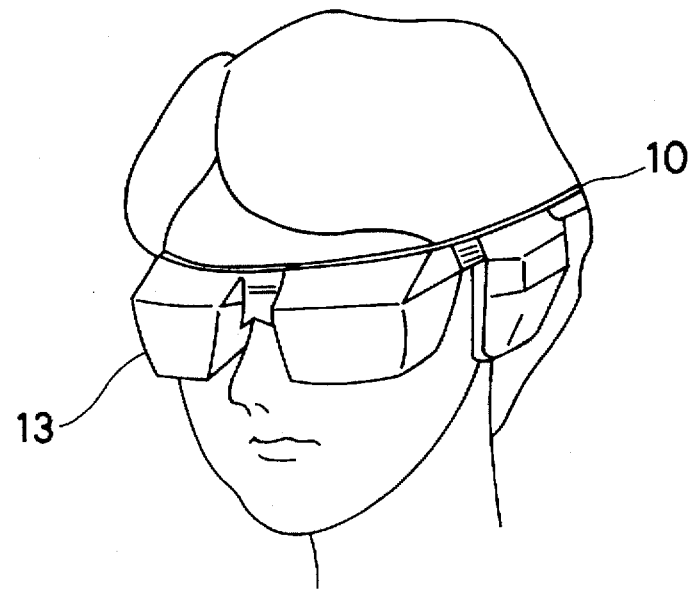

Although examples in which an ocular optical system according to the present invention is applied to an image display apparatus have been described above, it should be noted that the present invention is not necessarily limited to these examples, and that various modifications may be imparted thereto. To arrange the image display apparatus according to the present invention as a head-mounted image display apparatus (HMD) 13, as shown in the sectional view of FIG. 13(a) and the perspective view of FIG. 13(b), the HMD 13 is fitted to the observer's head by using a headband 10, for example, which is attached to the HMD 13. In this example of use, the HMD 13 may be arranged such that the second surface of the first optical element 7 is formed by using a semitransparent mirror (half-mirror) 12, and a liquid crystal shutter 11 is provided in front of the half-mirror 12, thereby enabling an outside world image to be selectively observer or superimposed on the image of the image display device 6.

Figure 14:
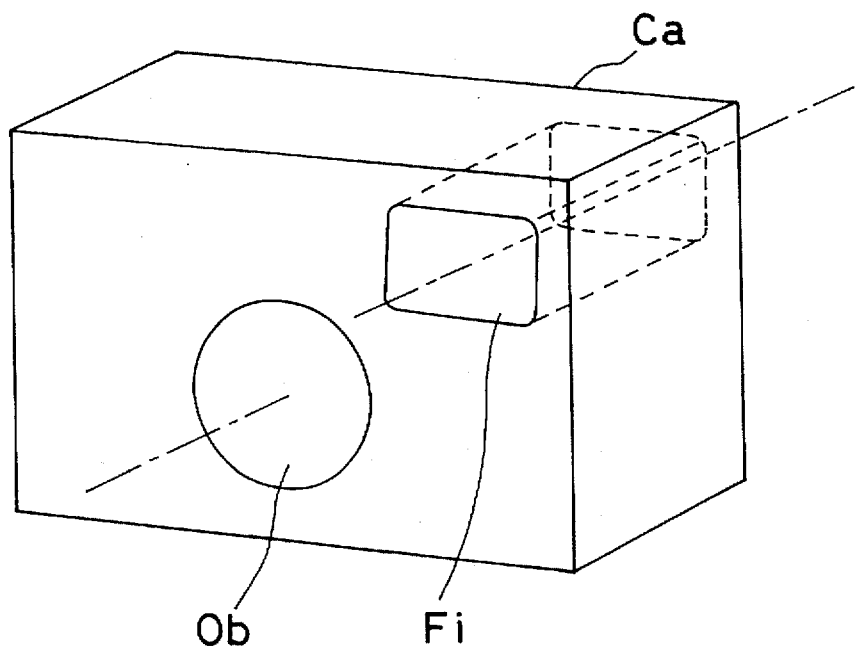
FIG. 14 shows an arrangement in which an optical system according to the present invention is used as an imaging optical system.
Figure 15:
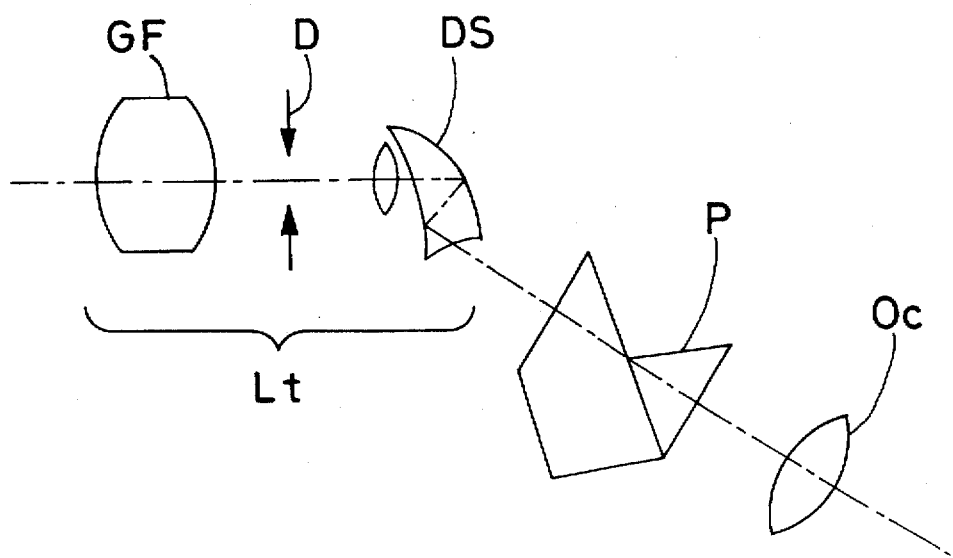
FIG. 15 shows an arrangement of an optical system in which an optical system according to the present invention is used as an imaging optical system.
Figure 16A:
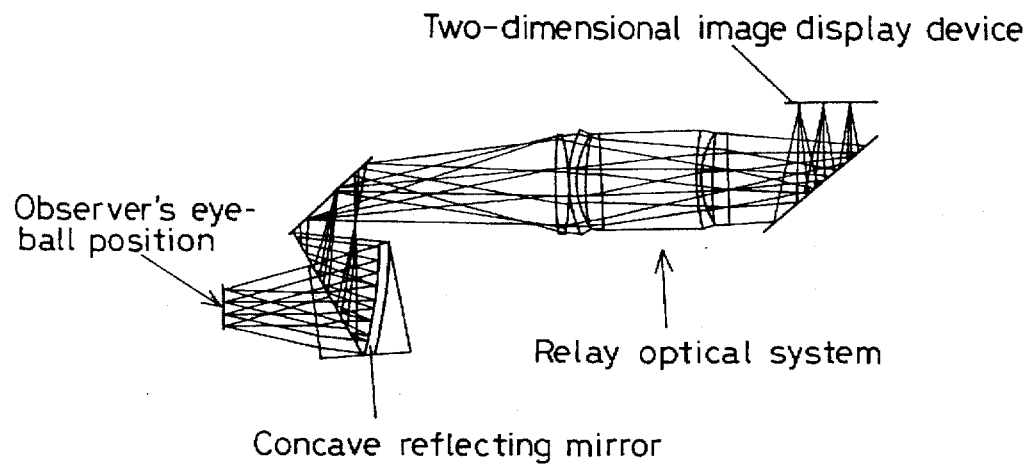
FIG. 16(a) and 16(b) show an optical system of a conventional image display apparatus.
Figure 16B:
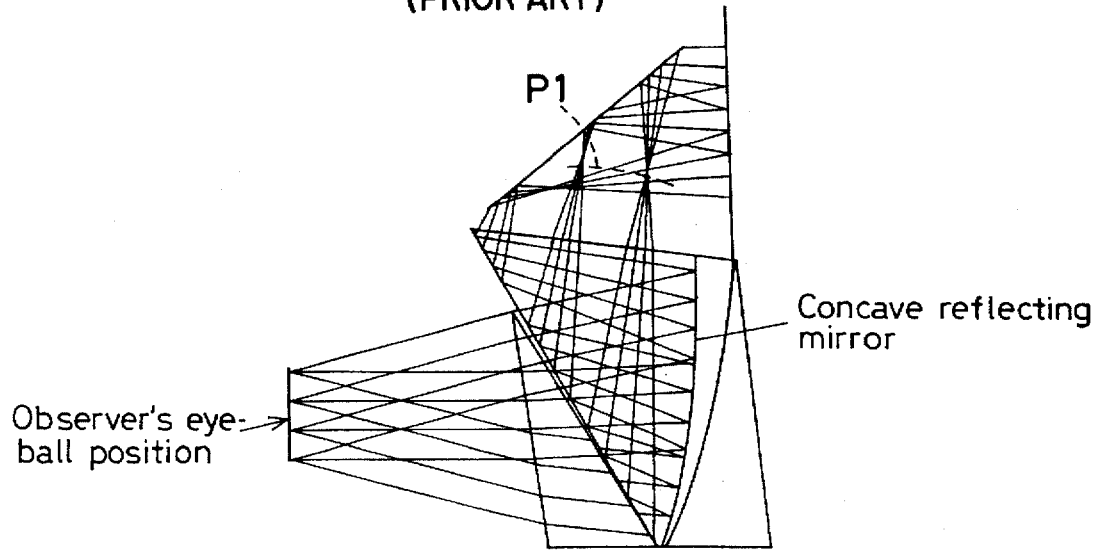
Figure 19:
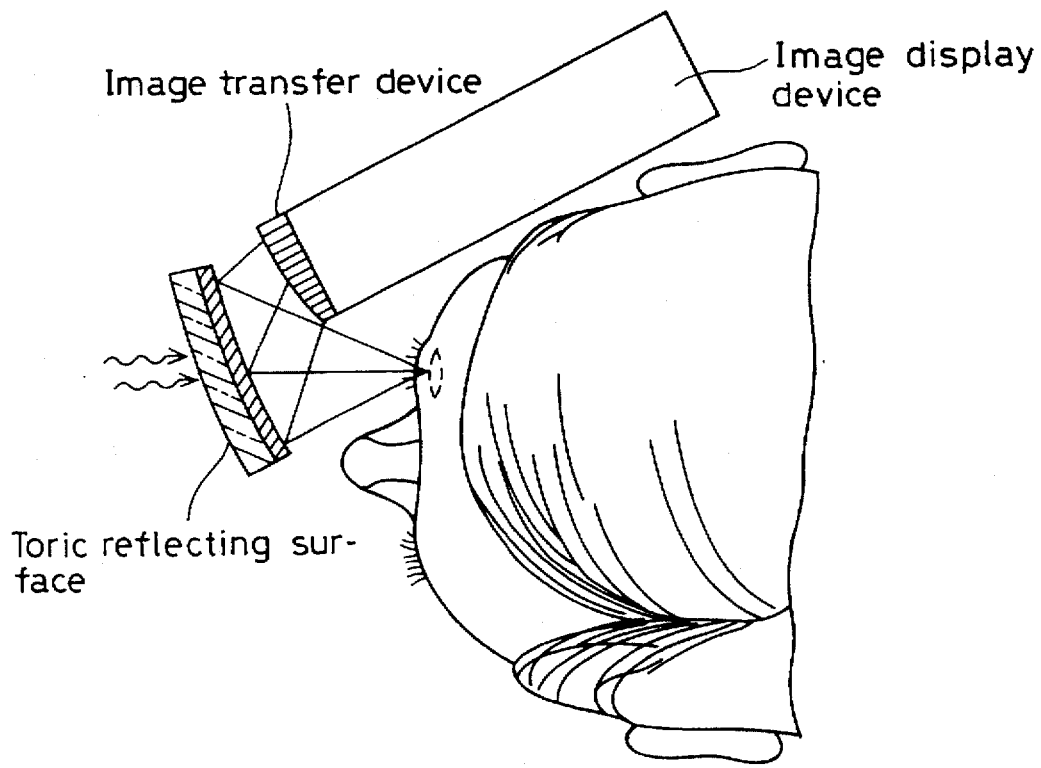
FIG. 19 shows an optical system of a further conventional image display apparatus.
Figure 20:
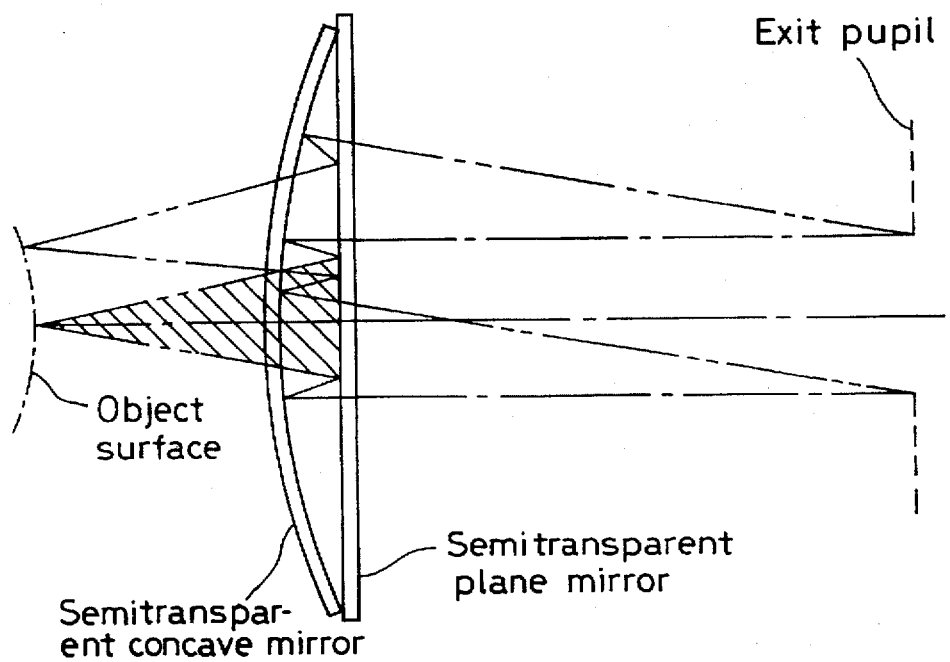
FIG. 20 shows an optical system of a still further conventional image display apparatus.

Further, the ocular optical system of the image display apparatus according to the present invention can be used as an imaging optical system. For example, as shown in the perspective view of FIG. 14, the ocular optical system may be used in a finder optical system $F_i$ of a compact camera $C_a$ in which a photographic optical system $O_b$ and the finder optical system $F_i$ are provided separately in parallel to each other. FIG. 15 shows an arrangement of an optical system in a case where the ocular optical system according to the present invention is used as such an imaging optical system. As illustrated, the ocular optical system DS according to the present invention is disposed behind a front lens group GF and an aperture diaphragm D, thereby constituting an objective optical system $L_r$. An image that is formed by the objective optical system $L_r$ is erected by a Porro prism P, in which there are four reflections, provided at the observer side of the objective optical system $L_r$, thereby enabling an erect image to be observed through an ocular lens $O_c$.

As will be clear from the foregoing description, it is possible according to the present invention to provide an image display apparatus which has a wide field angle and is extremely small in size and light in weight.

What I claim is:

1. An image display apparatus comprising an image display device for displaying an image, and an ocular optical system for projecting the image displayed by said image display device and for leading the projected image to an observer's eyeball, said ocular optical system including a first optical element and a second optical element, said first optical element having at least three surfaces, wherein a space formed by said at least three surfaces is filled with a medium having a refractive index larger than 1, said at least three surfaces being, in order in which light rays pass according to backward ray tracing from said observer's eyeball toward said image display device, a first surface which serves as both a refracting surface and an internally reflecting surface, a second surface which is a reflecting surface of positive power facing said first surface and decentered or tilted with respect to an observer's visual axis, and a third surface which is a refracting surface closest to said image display device, said second optical element having refracting action and being disposed between said first surface and said observer's eyeball.

2. An image display apparatus according to claim 1, wherein said second optical element has positive power.

3. An image display apparatus according to claim 2, wherein said second optical element is a positive lens.

4. An image display apparatus according to claim 1 or 2, wherein said second optical element is a cemented lens.

5. An image display apparatus according to claim 1 or 2, wherein said second optical element is a special prism comprising two decentered optical surfaces.

6. An image display apparatus according to claim 1, wherein said second optical element is decentered or tilted with respect to said observer's visual axis.

7. An image display apparatus according to claim 1, wherein internal reflection at the first surface of said first optical element is total reflection.

8. An image display apparatus according to claim 1, wherein the first surface of said first optical element has an internally reflecting region which has been mirror-coated.

9. An image display apparatus according to claim 1, wherein at least one of the first, second and third surfaces of said first optical element is a decentered aspherical surface.

10. An image display apparatus according to claim 9, wherein at least one of the first, second and third surfaces of said first optical element is an anamorphic surface.

11. An image display apparatus according to claim 10, which satisfies the following condition:

$$R_{y2}/R_{x2} \geq 1 \qquad (1)$$

where, assuming that a vertical plane containing said observer's visual axis is defined as a YZ-plane, and a horizontal plane containing said observer's visual axis is defined as an XZ-plane, $R_{y2}$ is a radius of curvature in the YZ-plane of the second surface of said first optical element, and $R_{x2}$ is a radius of curvature in the XZ-plane of said second surface.

12. An image display apparatus according to claim 1, wherein the first surface of said first optical element is a reflecting surface having a convex surface directed toward said second surface.

13. An image display apparatus according to claim 1, wherein at least one of the first and third surfaces of said first optical element is tilted or decentered with respect to said observer's visual axis.

14. An image display apparatus according to claim 1, which satisfies the following condition:

$$5° < \alpha < 30° \qquad (2)$$

where $\alpha$ is an angle formed between a line normal to the second surface of said first optical element and an axial principal ray.

15. An image display apparatus according to claim 1, 9 or 10, wherein said image display device has a display surface tilted with respect to said observer's visual axis.

16. An image display apparatus according to claim 1, 9 or 10, further comprising means for positioning both said image display device and said ocular optical system with respect to an observer's head.

17. An image display apparatus according to any one of claims 1 to 16, further comprising means for supporting both said image display device and said ocular optical system with respect to an observer's head so that said image display apparatus can be fitted to said observer's head.

18. An image display apparatus according to claim 1, 9 or 10, further comprising means for supporting at least a pair of said image display apparatuses at a predetermined spacing.

19. An image display apparatus according to claim 1, 9 or 10, wherein said ocular optical system is used as an imaging optical system.

* * * * *